(12) United States Patent
Vu

(10) Patent No.: US 11,609,351 B2
(45) Date of Patent: Mar. 21, 2023

(54) MEASUREMENT OF IN SITU ROCK FORMATION PROPERTIES USING SURFACE SEISMIC SOURCES AND DOWNHOLE RECEIVERS

(71) Applicant: Cung K. Vu, Houston, TX (US)

(72) Inventor: Cung K. Vu, Houston, TX (US)

( * ) Notice: Subject to any disclaimer, the term of this patent is extended or adjusted under 35 U.S.C. 154(b) by 66 days.

(21) Appl. No.: 17/033,413

(22) Filed: Sep. 25, 2020

(65) Prior Publication Data

US 2021/0208298 A1 Jul. 8, 2021

Related U.S. Application Data

(60) Provisional application No. 62/905,827, filed on Sep. 25, 2019.

(51) Int. Cl.
*G01V 1/42* (2006.01)
*E21B 47/14* (2006.01)
*E21B 49/00* (2006.01)

(52) U.S. Cl.
CPC .............. *G01V 1/42* (2013.01); *E21B 47/14* (2013.01); *E21B 49/00* (2013.01); *G01V 2210/1299* (2013.01); *G01V 2210/1429* (2013.01); *G01V 2210/324* (2013.01); *G01V 2210/626* (2013.01); *G01V 2210/6222* (2013.01)

(58) Field of Classification Search
CPC ............ G01V 1/42; G01V 2210/1299; G01V 2210/1429; G01V 2210/324; G01V 2210/6222; G01V 2210/626; G01V 2210/1295; G01V 2210/624; E21B 47/14; E21B 49/00

See application file for complete search history.

(56) References Cited

PUBLICATIONS

Minato et al., Cross-Well Seismic Survey Without Borehole Source, 2007, SEG/San Antonio 2007 Annual Meeting, pp. 1357-1361 (Year: 2007).*
Byun et al., Crosswell Monitoring Using Virtual Sources and Horizontal Wells, May-Jun. 2010, Geophysics, vol. 75, No. 3, pp. SA37-SA43 (Year: 2010).*

(Continued)

*Primary Examiner* — Toan M Le
(74) *Attorney, Agent, or Firm* — Samuel M. Freund; Cochran Freund & Young LLC

(57) ABSTRACT

Methods for measuring seismic velocities and for monitoring local changes in inter-well seismic velocities in real time are described. Two or more spaced-apart observation wells are provided. Seismic receiver arrays are placed in the observation wells, and a seismic source array is provided at surface locations away from the well bores and producing areas. Compression (P), vertical shear (Sv) and/or horizontal shear (Sh) seismic wave signals are generated from each element of the seismic source array, and the seismic signals arriving at the receivers in the observation wells are recorded. The virtual source method is then applied to the recorded data to compute emulated cross-well seismic signals of the virtual sources at receiver locations in one observation well propagating toward the receivers at other observation wells. Analysis of direct arrivals of emulated cross-well seismic signals can be completed to extract travel times, inter-well seismic velocities, and rock properties.

15 Claims, 19 Drawing Sheets

(56) References Cited

PUBLICATIONS

Minato, S., & Ghose, R., "Time-lapse target-oriented crosswell full waveform inversion without downhold sources", in Near Surface Geoscience Conference & Exhibition 2019: Sep. 8-12, 2019, The Hague, Netherlands (pp. 1-5) EAGE.

S. Minato and T. Matsuoka, Kyoto University, Y. Okajima, and J. Tsuchiyama, Recyclable-Fuel Storage Co., D. Nobuoka, H. Azuma, and T. Iwamoto, "Cross-well seismic survey without borehole source", SEG/San Antonio 2007 Annual Meeting, pp. 1357-1361.

Andrey Bakulin and Rodney Calvert, "The virtual source method: Theory and case study", Geophysics, vol. 71, No. 4 (Jul.-Aug. 2006); pp. SI139-SI150.

Kurang Mehta, Denis Kiyashchenko, Patsy Jorgensen, Jorge Lopez, Javier Ferrandis, and Michael Costello, "Virtual source method applied to crosswell and horizontal well geometries", The Leading Edge, Jun. 2010, Special Section: Borehole Geophysics.

Majed Almaki, Brett Harris, J. Christian Dupuis, Field and synthetic experiments for virtual source crosswell tomography in vertical wells: Perth Basin, Western Australia, Journal of Applied Geophysics, 2013, 144-159.

Jeongmin Yu, Joongmoo Byun, Soon Jee Seol, Vp/Vs monitoring of $CO_2$ sequestration using virtual horizontal crosswell tomography, Geosciences Journal, vol. 19, No. 3, p. 441-448, The Association of Korean Geoscience Societies and Springer, Sep. 2015.

\* cited by examiner

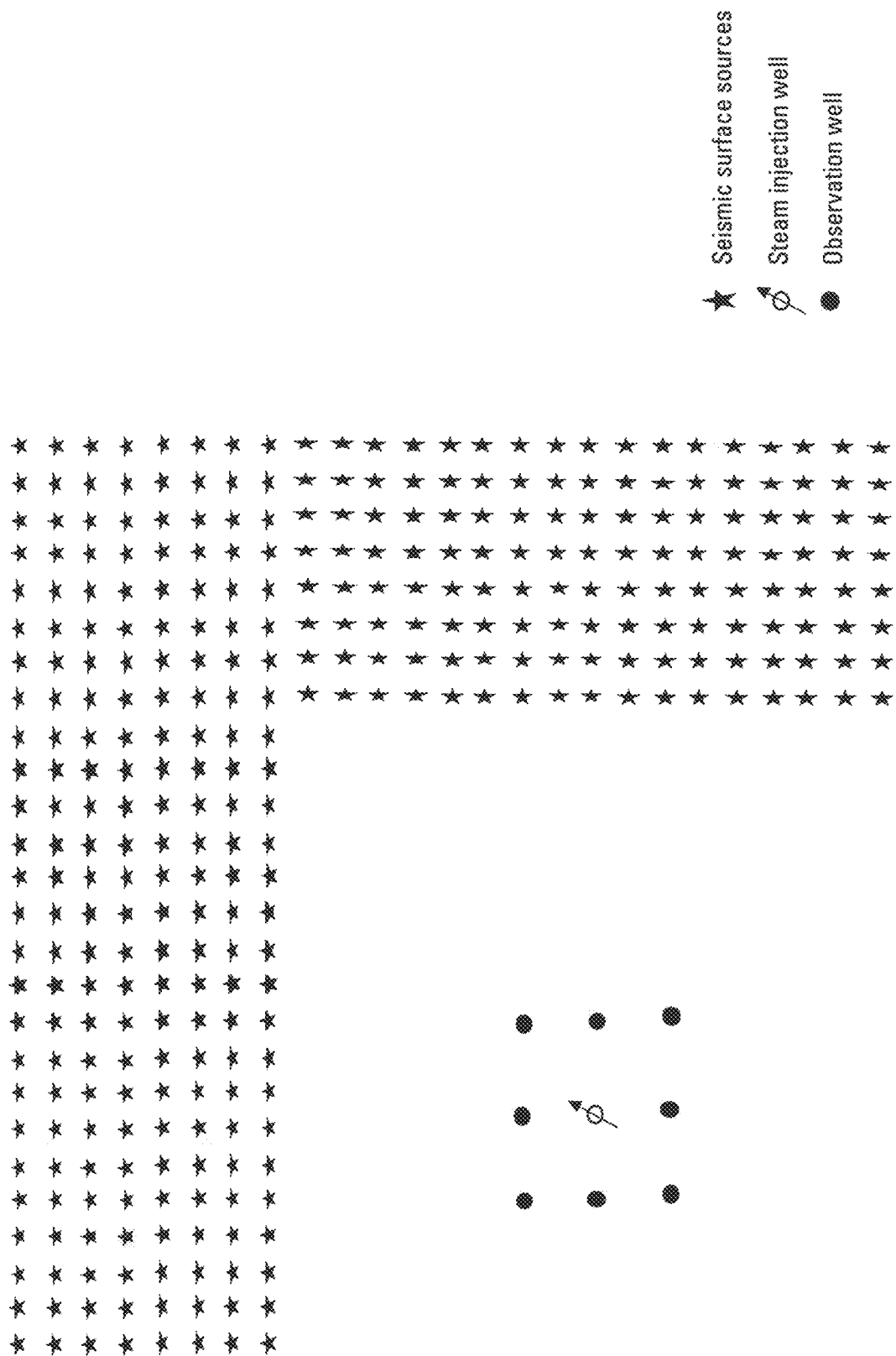

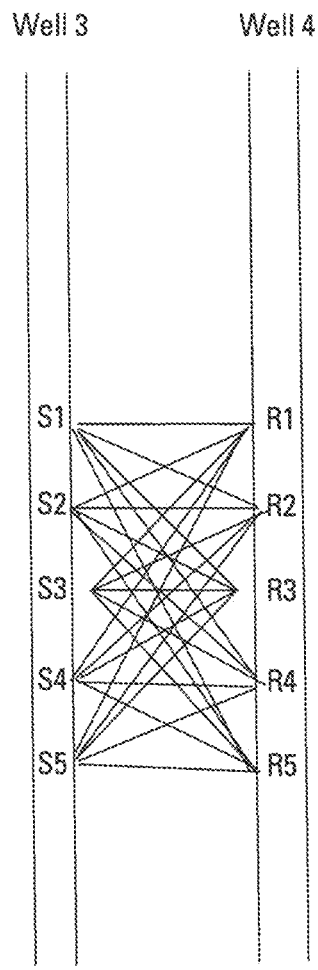
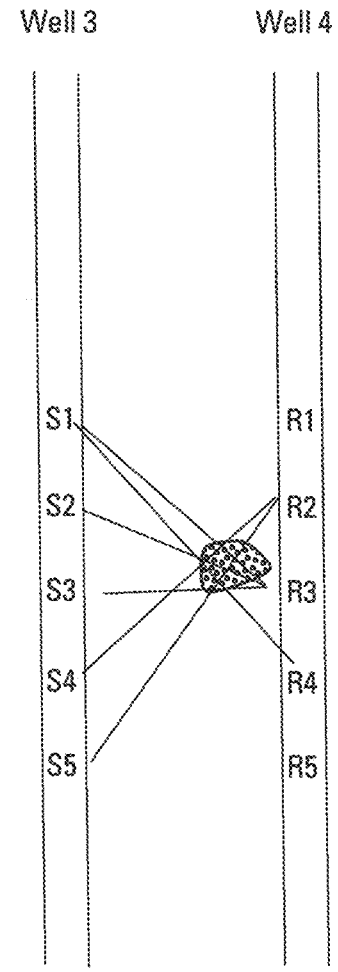
FIG. 2B
FIG. 2C

MEASUREMENT OF IN SITU ROCK FORMATION PROPERTIES USING SURFACE SEISMIC SOURCES AND DOWNHOLE RECEIVERS

CROSS-REFERENCE TO RELATED APPLICATIONS

The present application claims the benefit of U.S. Provisional Patent Application No. 62/905,827 for "Measurement Of In Situ Rock Formation Properties Using Surface Seismic Sources And Downhole Receivers" by Cung Vu, which was filed on 25 Sep. 2019, the entire content of which application is hereby specifically incorporated by reference herein for all that it discloses and teaches.

BACKGROUND

To optimize production of conventional and unconventional oil fields, it is important to measure and monitor reservoir geomechanical properties, such as effective stress fields, bulk and shear moduli, Poisson's ratio and anisotropy factors, in order to assess the changes induced by oil field operations, e.g., primary production, secondary recovery with water injection, tertiary recovery with gas injection or steam flooding, as well as well stimulation with hydraulic fracturing. For example, in steam flooding operations, it is important to assess the movements of the steam front and any barriers to steam movement for field optimization purposes. This would be possible if changes in geomechanical properties of the reservoir due to steam front movement can be monitored in real time. Currently only a fraction of the hydraulic fracturing (HF) operation stages in a horizontal well are successful in enhancing oil and gas productivity. To assess the effectiveness of each HF stage, it is important to detect the directions and lengths of the fractures induced by HF operation. The induced fractures will cause changes in local geomechanical properties surrounding the producing well bore.

Real-time monitoring of changes in geomechanical properties of the reservoir are difficult to accomplish with the current suites of subsurface technology used in the oil and gas industry. Core measurements do not provide in situ geomechanical measurements as the rock cores might have been altered from the in situ conditions by the coring and core retrieval operation. Standard sonic logging tools read only a few inches to a foot into the rock formation from a borehole, which can also be altered from the in situ condition by the borehole drilling operation.

As the velocities of seismic waves are related to in situ geomechanical properties via rock mechanic relationships, real time measurement and monitoring of local changes in seismic velocities can yield valuable information on the geomechanical state of the reservoirs. Conventional surface and borehole 3D seismic imaging only provide information on acoustic and shear impedance contrast of the earth. Associated information on seismic velocities or anisotropy properties extracted from 3D seismic imaging methods only have limited spatial and vertical resolution. Furthermore, time-lapsed conventional surface 4D seismic imaging would require weeks, if not months, of processing and, therefore, is not a real time monitoring tool. In onshore environment, time-lapsed 4D seismic operations are often not feasible as seismic source signal generation inside the oil field operating areas would interfere with ongoing field operational activities.

SUMMARY

An embodiment of the present invention is includes a method for measuring local seismic velocities, which have rock mechanic relationships with in situ geomechanical properties of conventional and unconventional reservoirs, and to monitor changes induced by oil field operations, e.g., primary production, secondary recovery with water injection, tertiary recovery with gas injection or steam flooding, and well stimulation with hydraulic fracturing. The present measurement methodology comprises deploying seismic source arrays on the surface and placing a plurality of receivers in two or more observation boreholes that are spaced apart in the producing reservoir section targeted for monitoring. The seismic signals detected at the receivers in the observation wells are recorded and processed in real time on a computer using the virtual source method in seismic interferometry to obtain emulated cross-well seismic signals between virtual sources located in one observation well propagating through the reservoir toward the receivers located in other observation wells. The inter-well compressional velocities, shear velocities in multiple directions, Poisson's ratio and other anisotropic properties for the reservoir zones between observation wells can be calculated from the emulated cross-well seismic signals of virtual sources by various well-known seismic industry techniques of travel time analysis, tomographic inversion, and Full Waveform Inversion.

Another embodiment of the invention includes the methodology to design the seismic acquisition geometry so that (a) the seismic source array can be located at a distance away from field operational areas to minimize interference with other non-seismic field management activities, and (b) the undesirable noises can be suppressed in the processing step to yield high signal-to-noise ratio emulated cross-well seismic signals generated by virtual sources in an observation well propagating to receivers in other observation wells so that reliable analysis of times of flight and amplitudes of the emulated cross-well seismic signals from virtual sources and receivers in the observation wells can be performed to obtain inter-well velocities.

Yet another embodiment of the invention is the capability to detect and measure almost in real time (within hours) the changes in inter-well seismic velocities that can subsequently be used to assess local changes in geomechanical reservoir properties that are induced by depletion, production stimulation with hydraulic fracturing or tertiary recovery with gas or steam injection. This real time capability would enable the field engineers to make quick assessments of the impact of their production stimulation techniques on the reservoirs, e.g., propagation of injected water, steam, or gas fronts in secondary or tertiary recovery, propagation of induced fractures in each hydraulic fracturing stage, and to make appropriate adjustments to operational activities during their field operation. In contrast, the 4D time-lapsed reflection seismic method would interfere with onshore field operation areas and requires weeks or months of acquisition and processing. This time delay makes time-lapsed information from conventional 4D seismic less useful as the observed changes in time-lapsed seismic properties are the results of a multitude of field operation activities during the time lag. Hence, these changes observed in 4D seismic cannot be attributed to any specific field operation activity. The time delay of at least a few weeks would also preclude any opportunity to adjust field operations in real time.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2A is a diagram of and embodiment of the acquisition geometry for real time monitoring of a steam front with cross-well direct arrivals from emulated virtual sources, FIG. 2B shows the network of seismic travel paths between pairs of virtual sources and receivers between observation wells, and FIG. 2C shows how the appearance of a steam front changes the cross-well travel times of a subset of travel paths allowing for real-time detection of the steam front.

FIG. 7A is a schematic representation of two parallel wells each having receivers spaced 80 ft apart with zero offset, acting as virtual sources and cross-well receivers, while

FIG. 11A is a schematic representation showing direct arrival events in cross-well seismic signals of virtual source and receiver pairs, illustrating down-going virtual P waves, the lighter portion indicating a low-velocity zone, when the receiver locations are directly below the virtual sources, while

FIG. 12A a schematic representation showing direct arrival events in cross-well seismic signals of virtual source and receiver pairs, showing down-going virtual P waves, the lighter portion indicating a low-velocity zone, when the receiver locations are 45° offset and below the virtual sources, while

FIG. 14A is a schematic representation showing direct arrival events in cross-well seismic signals of virtual source and receiver pairs, illustrating down-going virtual Sv waves, the lighter portion indicating a low-velocity zone, when the receiver locations are 26.6° offset and below the virtual sources, while

FIG. 15A is a schematic representation showing direct arrival events in cross-well seismic signals of virtual source and receiver pairs, illustrating down-going virtual Sv waves, the lighter portion indicating a low velocity zone, when the receiver locations are 26.60 offset and below the virtual sources, while

DETAILED DESCRIPTION

Figure 1:
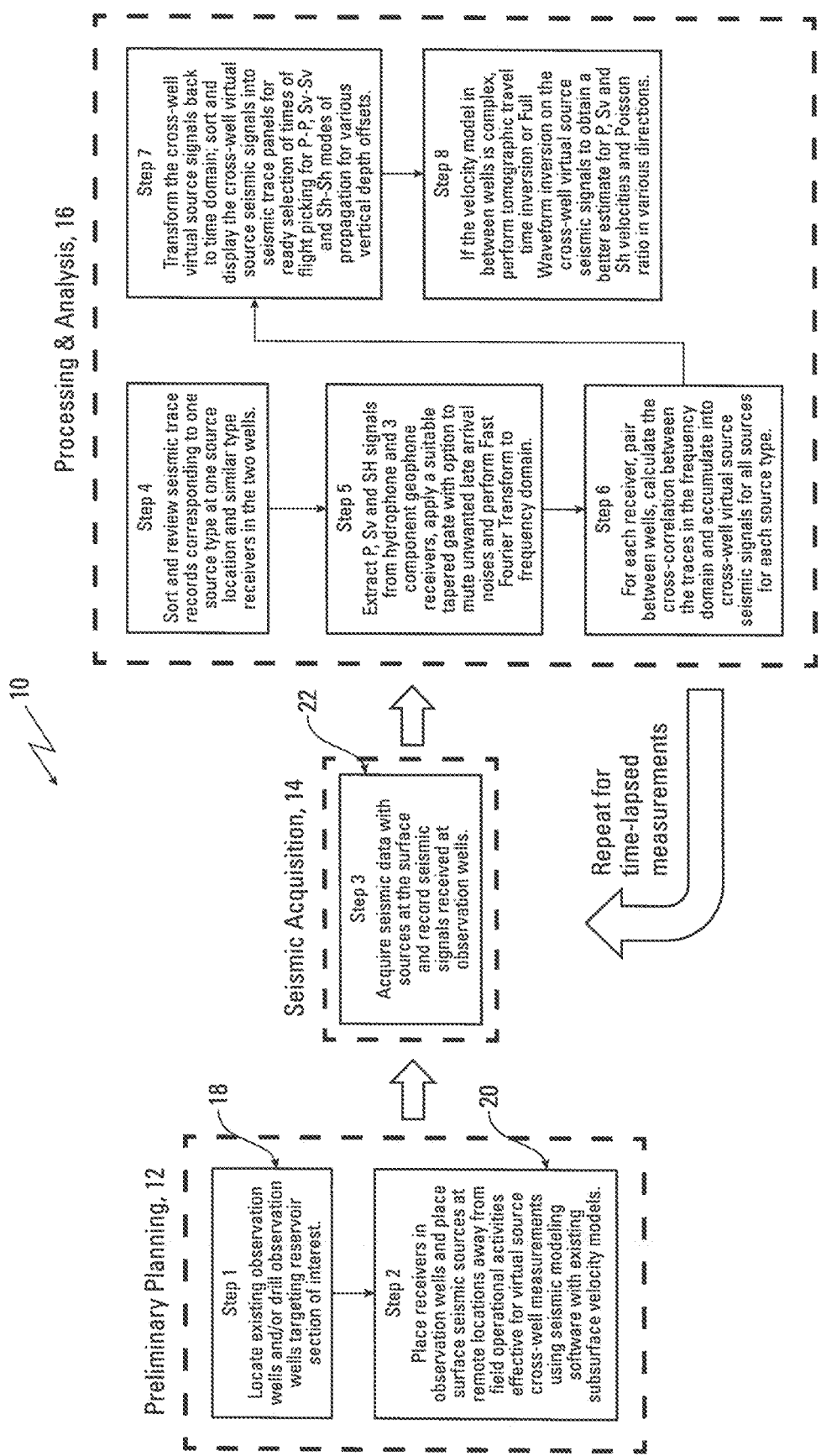
FIG. 1 is a block diagram of an embodiment of the high level acquisition, processing and analysis sequence workflow for real time measurements of seismic velocities, Poisson's ratio, and rock properties of reservoirs during field operations.

The present invention relates to the field of cross-well tomography for the use in exploration and production of conventional and unconventional reservoirs. Embodiments of the invention include seismic acquisition and processing methods using seismic source arrays on the surface and receiver arrays in observation boreholes that can be performed during production operational activities in real time to measure in situ geomechanical properties of rock formations near the observation boreholes and to monitor time-lapsed changes in the reservoir properties induced by oil and gas field operation activities.

Cross-well seismic tomography is a technology which permits the interrogation of the geomechanical properties of the rock formations between two spaced apart wells. Generally, a downhole seismic source is placed in a first well and a plurality of downhole seismic receivers are placed in a second well. The seismic source in the first well is then activated to generate a seismic signal which propagates through the subsurface formations to the seismic receivers in the second well where it is recorded. The resulting seismic data can be processed to yield information on the subsurface formations through which the seismic signals passed. U.S. Pat. No. 4,214,226 issued Jul. 22, 1980 to Narasimhan et al. provides a general description of cross-well seismic tomography.

A number of downhole seismic sources have been developed to enable the acquisition of cross-well seismic data for use in the oil and gas industry. The application of downhole seismic source to cross-well tomography are limited due to source strength restrictions to prevent borehole damages and the difficulties of deploying downhole seismic sources.

Cross-well measurement methods to estimate the inter-well seismic velocity fields without the use of downhole sources, thereby avoiding the difficulties of deploying downhole sources, are known. In such methods, a surface seismic source is used to generate a seismic signal at a location on the surface of the earth substantially in line with, but not between, the wells and closer to the first well than to the second well. A plurality of downhole seismic receivers are located in the first well and at least one downhole seismic receiver is located in the second well. The actual arrival time of the seismic signal at each of the first well and second well seismic receivers is picked and recorded. For each second well seismic receiver, the actual arrival time is then compared to an estimate of the seismic signal travel time calculated on the basis of an assumed inter-well seismic velocity field. If the estimate of the seismic signal travel time is not equal to the actual arrival time for each second well seismic receiver, the assumed inter-well seismic velocity field, from measured sonic well logs, is modified and the calculation is repeated. In this manner, the inter-well seismic velocity field can be determined.

The cross-well measurement method above requires the ability to pick accurate arrival times for seismic wave arrivals from surface seismic sources. When the seismic wave propagation is complex, the seismic signals would have many simultaneous arrivals making accurate picking of the travel times of the direct arrivals very difficult. Hence, the cross-well measurement method using picked travel times can be ineffective in many circumstances.

An alternative approach is to generate virtual seismic source signals in a borehole using the physics time reversal principle in physics to emulate a virtual source signal in the borehole. Applications of the virtual source method, a part of the seismic interferometry technology area, in the oil and gas industry are summarized in the publications by K. Wapenaar et al. (2008) and G. Shuster (2009).

Emulated cross-well signals may be mathematically constructed between two wells from the seismic signals recorded by receivers located in the two wells due to some external seismic sources located outside the wells.

The applications of the virtual source method using receivers in boreholes and surface seismic sources in the seismic industry have been focusing on improving the seismic images of subsurface reflections in the presence of near surface or overburden complexity. Virtual source application for seismic imaging of earth reflectors at shallow depth has been described by Minato et al. (2007). The receivers are placed in two closely spaced vertical wells and the external seismic sources are placed close to the surface locations of the wellheads, an acquisition geometry more favorable for shallow reflection seismology.

Another application of the virtual source method to obtain subsurface seismic images from seismic reflections of earth reflectors below a horizontal well has also been described by Bakulin and Calvert (2006). The seismic sources are placed at the surface and the receivers in the well. The summations of the cross correlations between the direct wave arrivals and the reflected signals from subsurface reflectors would yield reflection signals between the emulated virtual sources and the receivers in the well. The advantage of this virtual source application is that the obtained seismic images would be less dependent on the overburden velocity complexities than the images obtained from conventional surface seismic sources.

Two experiments of the virtual source method applied to vertical and horizontal well geometries for the purpose of imaging subsurface reflectors has also been described by Mehta et al. (2010). In the vertical well geometry case, the acquisition geometry has receivers in two vertical wells and external seismic sources at the surface near the surface locations of the well heads. Various methods to enhance signal processing to improve the subsurface images are known. The wave field separation (deconvolution) processing method was used to extract down going waves and upcoming waves to minimize the noise contamination in the image processing step. In the horizontal well geometry case, the acquisition geometry has receivers in a single horizontal well and seismic sources at the surface.

In accordance with the teachings of embodiments of the present invention, a method, 10, for measuring inter-well seismic velocities and for monitoring local changes in inter-well rock properties in real time can be constructed as follows. The present measurement methodology illustrated in FIG. 1 would include, preliminary planning, 12, seismic acquisition, 14, and processing and analysis, 16, components, comprising drilling two or more spaced-apart observation wells or reconfiguring existing wells in the oil field where monitoring of geomechanical properties is needed, 18, placing seismic receiver arrays in the observation wells and deploying a seismic source array at surface locations away from the well bores and producing areas, 20. The observation wells can be at arbitrary orientations and do not have to be straight as long as the wells would "sandwich" the volume of reservoir rock under investigation. The measurement technique involves generating compression (P), vertical shear (Sv) and/or horizontal shear (Sh) seismic wave signals from each element of the seismic source array and recording of the seismic signals arriving at the receivers in the observation wells, 22. The virtual source method in seismic interferometry technology is then applied to the recorded data to compute emulated cross-well seismic signals of the virtual sources at receiver locations in one observation well propagating toward the receivers at other observation wells. Times of flight of direct arrivals in emulated cross-well seismic signals between the two wells can be subsequently picked by an automated computer picking program. As the location of the well paths of the observation wells are known from drilling measurements, the ratios of separation distance and the picked time of flights would yield the inter-well P, Sv, and Sh velocities of the reservoir between all pairs of virtual sources and receivers. Anisotropy properties and Poisson's ratio can then be derived from measured inter-well velocities using rock mechanic relationships. Alternatively, if the inter-well velocities are very complex, the velocity tomographic inversion and/or Full Waveform Inversion techniques can be applied to obtain inter-well velocities. All these acquisition and processing tasks can be completed in the field in real time (within a few hours or less) because the seismic data volume is small and the computing effort is minimal. Thus, the measurements for the inter-well seismic velocities, Poisson's ratio and anisotropy properties using the methodology described above can be repeated and changes to the geomechanical properties induced by producing operations can be assessed frequently, e.g., every few hours. The above measurement process will be referred to as the present measurement methodology in the remainder of the following description.

An embodiment of the present measurement methodology includes the design of the seismic acquisition geometry such that the seismic sources array can be positioned at a remote location away from the observation wells and field operation. It is known in the art of seismology that the velocity within the earth generally increases with depth and the seismic ray paths from surface sources can bend toward the horizontal direction as they propagate downward into the earth. The ray paths can propagate sideways, turn completely horizontal, then upward and return back to the surface. Thus, strong seismic signals can be received in receivers in the well bores at depth even though the seismic sources are located on the surface at a remote location away from the locations of the well heads of observation well bores and the operation field areas (see the geometry in FIGS. 3 and 4 as examples).

Embodiments of the present measurement methodology employs seismic acquisition modeling techniques to select the remote location away from field operation and to design acquisition geometry such that the cross-well seismic signals from emulated virtual sources in one observation well propagating to receivers in the other observation well(s) would have high signal-to-noise ratio. The latter condition would permit reliable measurements of times of flight and seismic amplitudes from the emulated cross-well seismic signals of virtual sources in one observation well arriving at receivers in other observation wells. An approximate velocity model is first derived from existing well controls and reflection seismic data. Seismic modeling programs are then used to calculate ray paths and/or synthetic seismic signals for various wave propagation modes, P, Sv or Sh, arriving at the receiver locations in an observation well that would be designated as locations for the virtual sources. The seismic source arrays of various propagation modes would be located at surface locations such that the ray paths and/or synthetic seismic signals would be dominated by wave energy propagating along the ray path trajectories of direct arrivals from virtual sources to the receivers in the other observation wells. By locating the seismic source array in this way, the time reversal operation in the virtual source method would generate strong cross-well signals from virtual sources. Additionally, locating the seismic source array at a remote location away from the wells using seismic modeling minimizes the noise caused by the slow surface waves arriving at the borehole generating tube waves down the observation bore holes as observed in the borehole seismic literature. Because the seismic source array is far away from the surface location of the observation boreholes, the seismic signals of direct arrivals would arrive at a much earlier time than the tube wave noises. The tube wave noises can be surgically blanked out from the measured seismic signals prior to the time reversal focusing operation to generate cross-well signals from virtual sources as discussed in the processing steps below.

The computation method for the emulated cross-well seismic signals of virtual sources at receiver locations in one observation well that propagate toward receivers at other observation wells follows the conceptual formulation by Bakulin & Calvert (2006). Let $\psi_{\alpha 1 \beta 1}(S_n, G_{m1}, t)$ and $\psi_{\alpha 2 \beta 2}(S_n, G_{m2}, t)$ be the measurements of the wave field of a seismic source $S_n$ at the surface arriving at receivers $G_{m1}$ in borehole 1 and $G_{m2}$ in borehole 2, where the subscript $\alpha$ and $\beta$ denote the directional components of the source or receiver of the waves, a for P, Sv, or Sh source and $\beta$ for geophone components—vertical z, horizontal x, horizontal y, or hydrophone. $\psi_{\alpha 2 \beta 2}(S_n, G_{m2}, t)$ would consist of all contributions from all path integrals of the wave field traveling from source $S_n$ to $G_{m2}$. By reciprocity, it can also be considered as the signal of the wave field traveling from $G_{m2}$ to $S_n$. From the principle of time reversal, if the time reversed signals $\psi_{\alpha 2 \beta 2}(S_n, G_{m2}, -t)$ are fed to all the seismic sources at the surface simultaneously, the wave fields from all the sources on the surface would propagate back to the receiver $G_{m2}$ and would add constructively together into a point source beaming at time t=0 a wave field propagating toward the receivers in other observation wells. As $\psi_{\alpha 2 \beta 2}(S_n, G_{m2}, t)$ is essentially a Green's function single pulse source occurring at time zero, the following wave field $W_{\beta 2 \beta 1}(G_{m1}, G_{m2}, t)$ can be mathematically computed from the summation of the cross-correlations between $\psi_{\alpha 2 \beta 2}(S_n, G_{m2}, -t)$ and $\psi_{\alpha 1 \beta 1}(S_n, G_{m1}, t)$:

$$W_{\beta 2 \beta 1}(G_{m2}, G_{m1}, t) = \sum_{S_n} \Psi_{\alpha i \beta 2}(S_n, G_{m2}, -t) \otimes \Psi_{\alpha i \beta 2}(S_n, G_{m1}, t) \quad (1)$$

where the $\otimes$ operation denotes convolution and the summation $\Sigma$ is over all available $S_n$ and $\alpha_i$.

This wave field $W_{\beta 2 \beta 2}(G_{m2}, G_{m1}, t)$ would consist of the wave field of an emulated zero phase wavelet pulse virtual source signal with component $\beta 2$ at receiver location $G_{m2}$ in well 2 propagating directly toward a receiver $G_{m1}$ with component $\beta 1$. Any incoherent noises would be cancelled in the cross-correlation and summation in Equation (1). There would be systematic noises due to other non-desirable propagation modes such as surface waves converting to tube waves down the boreholes. However, as the acquisition geometry is specifically designed such that the surface sources are located a remote distance away from the borehole surface location, the noises from the surface and tube waves would arrive at a much later time because the surface and tube waves propagate at much slower speed than P, Sv and Sh waves. Therefore, these noises can easily be excluded from the cross-correlation operation described in equation (1) by using a time-gating operation to filter out these late arrival noises prior to the cross-correlation operation in equation (1).

In one non-limiting implementation, the cross-correlation and summation in Equation (1) can be performed efficiently in the frequency domain on a computer. After a gating operation to filter out the late arrival unwanted noises, the signals are transformed into the frequency domain using standard Fast Fourier Transform methods. The convolution operation is performed in accordance with the formula:

$$W_{\beta 2 \beta 1}(G_{m2}, G_{m1}, \omega) = \sum_{S_n} \Psi^*_{\alpha i \beta 2}(S_n, G_{m2}, \omega) \times \Psi_{\alpha i \beta 2}(S_n, G_{m1}, \omega) \quad (2)$$

where "*" denotes complex conjugation and "x" denotes multiplication of complex numbers. The emulated cross-well signal for various receiver pairs are transformed back in time to yield emulated cross-well seismic signals $W_{\beta 2 \beta 1}(G_{m2}, G_{m1}, t)$ of virtual sources in one observation well to receivers in other observation wells.

When the receivers in the observation wells are hydrophones, i.e. $\beta 2$ and $\beta 1$ would denote P wave modes, the seismic signal $W_{PP}(G_{m2}, G_{m1}, t)$ would be the emulated cross-well seismic signals from a virtual P wave source located at hydrophone receiver $G_{m2}$ in one observation well propagating to receiver $G_{m1}$ located in the other observation well. The first arrival in the seismic signal $W_{PP}(G_{m2}, G_{m1}, t)$ would be the direct P-P wave propagation. The travel times of the direct P wave arrivals between $G_{m2}$ and $G_{m1}$ can be picked with automated event picking algorithms commonly used in the seismic industry. As the spatial positions of the well paths of the observation wells are recorded from well surveys conducted during drilling operation, the distance separation between $G_{m2}$ and $G_{m1}$ can be computed directly from the well path surveys. The ratio of the distance $G_{m2}$ and $G_{m1}$ and the picked travel times from $W_{PP}(G_{m2},$ $G_{m1}$, t) would yield the inter-well P wave velocity between $G_{m2}$ and $G_{m1}$. The exercise can be repeated for all pairs of $G_{m2}$ and $G_{m1}$ allowing for the measurements of inter-well P wave velocities in many different directions between any pair of wells. The multitudes of measured P wave velocities in many different direction of propagation will permit computation for the inter-well anisotropy factors of P wave velocities.

When the receivers in the observation wells are 3 component phones, i.e. β2 and β1 would denote coordinate components of geophone measurement, a rotation of coordinates would be applied to the signals $W_{β2β1}$ ($G_{m2}$, $G_{m1}$, t) to extract out the emulated signals for $W_{Sv\_Sv}$ ($G_{m2}$, $G_{m1}$, t) and $W_{Sh\_Sh}$ ($G_{m2}$, $G_{m1}$, t) for Sv and Sh virtual sources at propagating from $G_{m2}$. The same methodology discussed above for PP mode can then be applied to obtain measured average Sv and Sh velocities between $G_{m2}$ and $G_{m1}$ as well as anisotropy factors. The measurements of velocities of P, Sv and Sh waves will also yield measurement for the inter-well Poisson's ratio of the reservoir between $G_{m2}$ and $G_{m1}$ using rock mechanic relationships.

The acquisition, computation and analysis effort described above are small, of the same order as other standard borehole seismic applications such as VSP and, therefore, can be accomplished in real time (within hours) in the field. Thus, seismic acquisition and processing measurements can be repeated many times to yield time-lapsed measurements of seismic velocities, Poisson's ratios and anisotropy factors between receiver locations in the observation wells. In this way, the changes to the seismic velocities, Poisson's ratios and anisotropy factors induced by production and/or production stimulation activities can be monitored with high frequency.

The computing and analysis of the measurement method is not limited to travel time analysis. When the cross-well wave propagation between the virtual sources and receivers is complex, analysis of picked travel times might not be entirely accurate as noted in the computer simulation results discussed below. When needed, various advanced velocity estimation techniques often used in the seismic industry such as tomographic inversion and/or Full Wave Inversion (FWI) can be applied to the computed wave field $W_{β2β1}$ ($G_{m2}$, $G_{m1}$, t) to yield more accurate inter-well velocity measurements between the observation boreholes.

A summary of the workflow protocol of the present measurement methodology described above is displayed in FIG. 1. The general workflow protocol can be adapted to various specific applications for any particular reservoir monitoring purpose. Computer simulation results of two specific reservoir management applications to demonstrate the feasibility and applicability of the present measurement methodology are described below. In the computer simulation, synthetic seismic data are generated by a numerical finite difference modeling computer program in lieu of actual field data. The first application is for steam front monitoring in steam flooding in heavy oil fields. The second application is for the detection of changes in the local geomechanical properties during each hydraulic fracturing stage in the hydraulic fracturing operations of unconventional reservoirs. It should be noted the configurations of observation wells, seismic source and receiver arrays in the computer simulation discussed below are non-limiting examples of configurations chosen to illustrate the feasibility of the present measurement methodology. The workflow protocol of the present measurement methodology permits the design of other configurations that would be more optimum for specific field application and field conditions.

An example of real time reservoir monitoring application of the present measurement methodology would be for monitoring steam front for heavy oil production with steam injection. Information on real time movement of the steam front is critical for the effective management of steam injection rate in the heavy oil field. Observation wells inside the oil field are often drilled to measure temperatures and pressures as a function of time, from which the location of moving steam front can be inferred. The application of the workflow for the present measurement methodology in FIG. 1 can be applied to obtain cross-well seismic measurements with emulated virtual sources for time-lapsed changes in Vp and Vs as well as seismic amplitude changes due to seismic wave absorption. This information can then be used for the rapid detection of steam front movements as a small amount of steam would make very large local changes in Vp and Vs. FIG. 2A shows one non-limiting acquisition geometry for steam flood monitoring with seismic receivers permanently placed in the observation wells and seismic sources placed at the surface. In each plane defined by two observation vertical well paths, there would be a "mesh" of direct arrival travel time measurements between the two wells (FIG. 2B). When the steam front encroaches on a point on the mesh, travel times and amplitude changes in the cross-well seismic signals would be detected in real time. As there are a multitude of observation wells, there would be a multitude of mesh planes between observation wells around the injection wells so the movement of the steam front can then be mapped in three dimensions (FIG. 2C).

The following computer simulation results demonstrate the feasibility of measuring changes in inter-well seismic velocities that are caused by steam front encroachment using emulated cross-well seismic signals from virtual sources from one observation well to receivers in another observation well.

Figure 3:
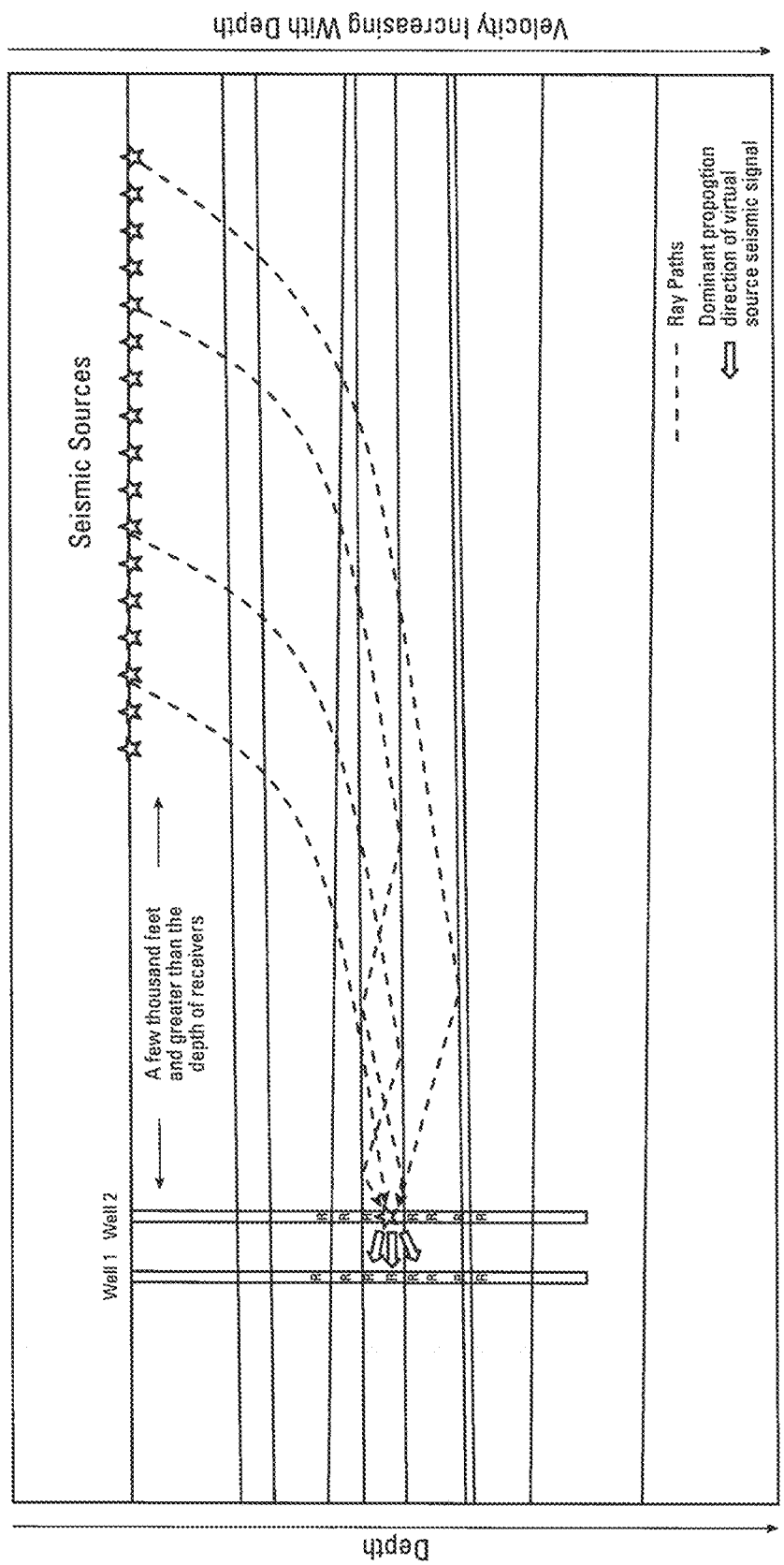
FIG. 3 is a diagram of a vertical cross-section of an embodiment of seismic sources and receivers acquisition geometry for cross-well simulation of virtual sources in two vertical wells without velocity anomalies.
Figure 4:
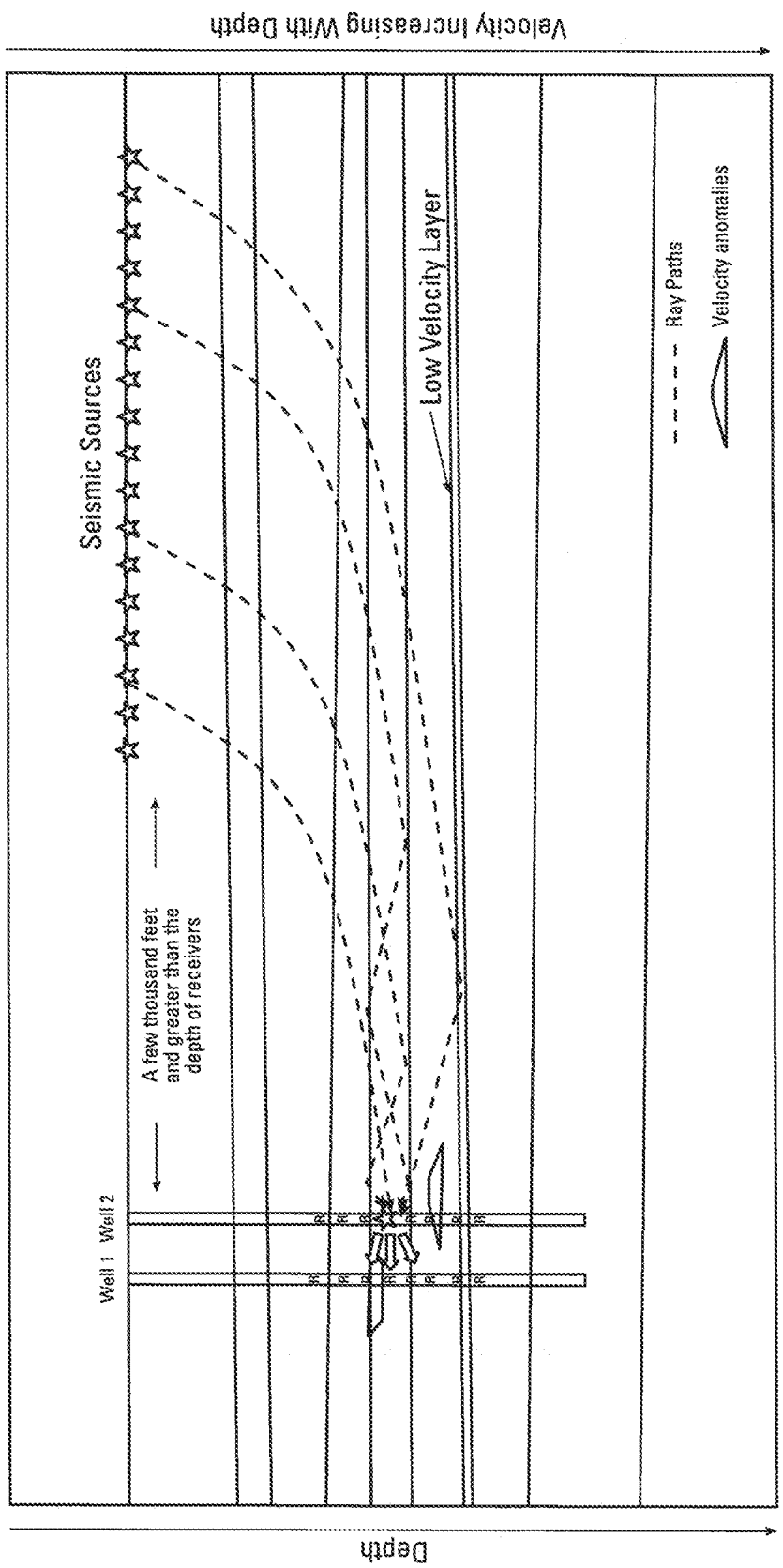
FIG. 4 is a diagram of a vertical cross-section of an embodiment of seismic sources and receivers acquisition geometry for cross-well simulation of virtual sources in two vertical wells with a velocity model used in numerical simulation, and with velocity anomalies.

FIG. 3 shows a subsurface model with two vertical observation wells separated by 400 feet used in the computer simulation. The model has a number of layers with velocity generally increasing with depth with some layers exhibiting velocity reversal. FIG. 4 shows the same velocity with two additional small velocity anomalies of order 50 feet in thickness and 100 feet in length. The anomalies in between the two wells represent low velocity zones due to encroachment of a moving steam front. The objective of the simulation is to test whether the present measurement methodology can detect in real time the two small velocity anomalies in FIG. 4.

Figure 5:
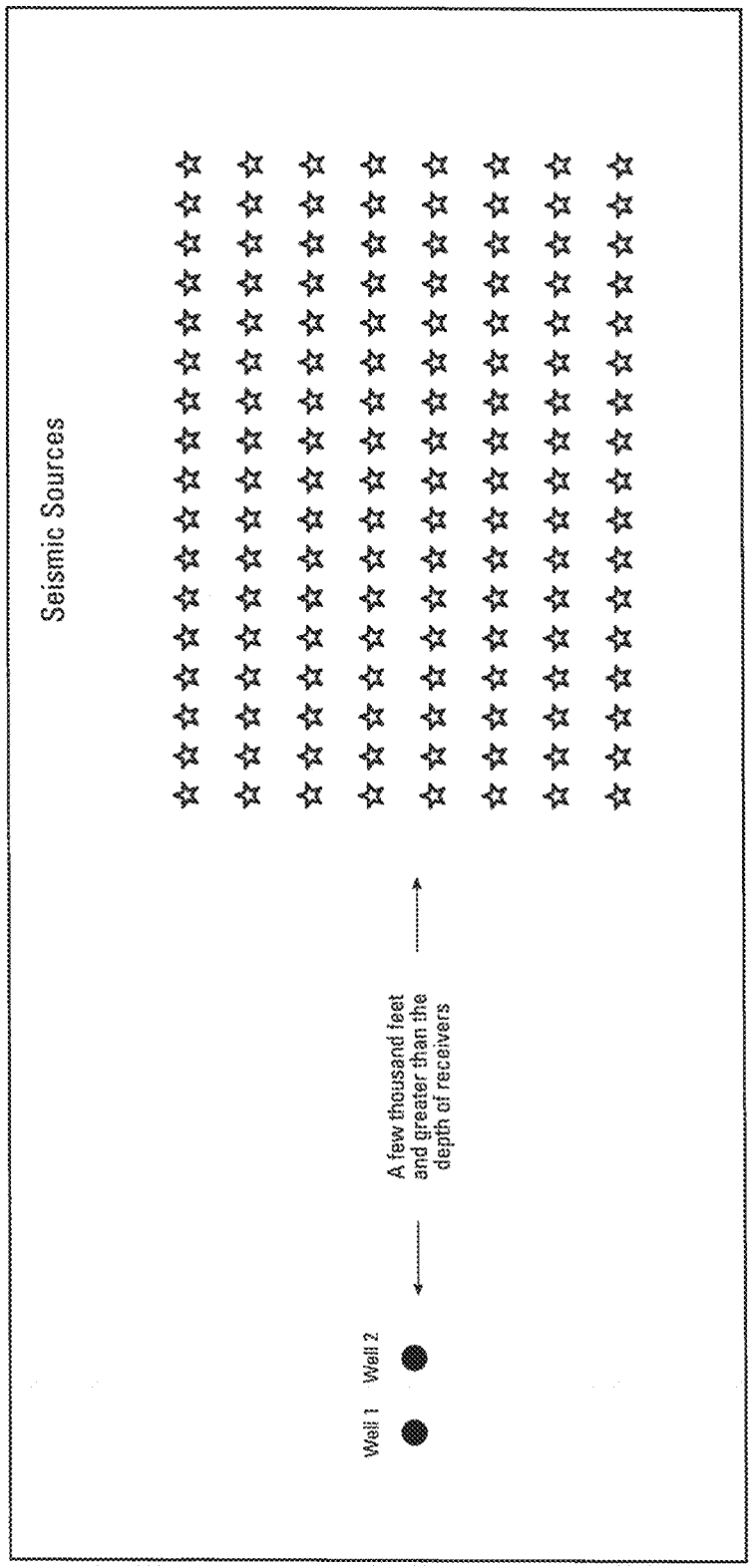
FIG. 5 is a diagram of a horizontal view of an embodiment of seismic sources and well locations geometry for cross-well simulation of virtual sources in two vertical wells.

The seismic acquisition geometry is designed in accordance with step 2 of the measurement workflow (see FIG. 1) using an approximate smooth velocity model constructed from the velocity information at the well controls. A plurality of receivers, which can be either 3-component geophones or hydrophones, are placed in each observation well. In the simulation exercise, there are 80 receivers located at approximately the same depth between 1500 ft and 3100 ft and spaced at regular depth interval of 20 feet. The seismic source array at the surface is placed at a distance considerably greater than the depth of the receivers away from the wells. FIG. 5 shows the surface horizontal view of the seismic source acquisition geometry. The seismic sources are located in a two dimensional arrays with regular spacing.

FIGS. 3 and 4 display examples of the multitudes of propagation paths for P wave sources: direct waves, reflections, multiple reflections as well as trapped waves. The locations of the seismic array sources are selected in the seismic acquisition design step such that the early arrivals of P wave propagation would be arriving at the receivers in well 1 and well 2 predominantly in a horizontal direction due to ray path bending and selected locations of the seismic array, at sufficient distances from the wellbores. The same situation obtains for the horizontal well sections illustrated in FIG. 10. It should be noted that for shear wave, the seismic source array would be located at a different location from the P source array as the P and S velocity gradients of the earth would be different and, therefore, the ray bending is different for the two waves.

Figure 6B:
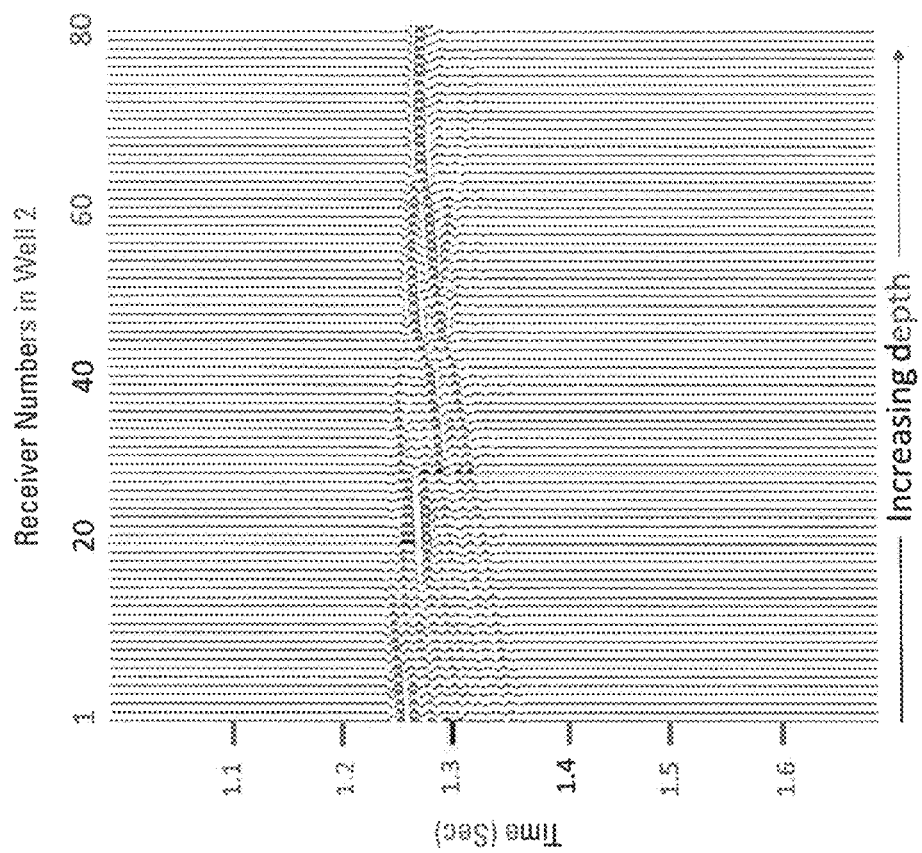
FIGS. 6A and 6B are illustrations of synthetic seismic traces generated by finite-difference modeling of the velocity model from FIG. 3 for hydrophone receivers in vertical wells 1 (FIG. 6A) and 2 (FIG. 6B) and for one P wave seismic source located at the surface in the acquisition geometry described in FIGS. 3 and 4, for a 20-foot receiver separation.
Figure 6A:
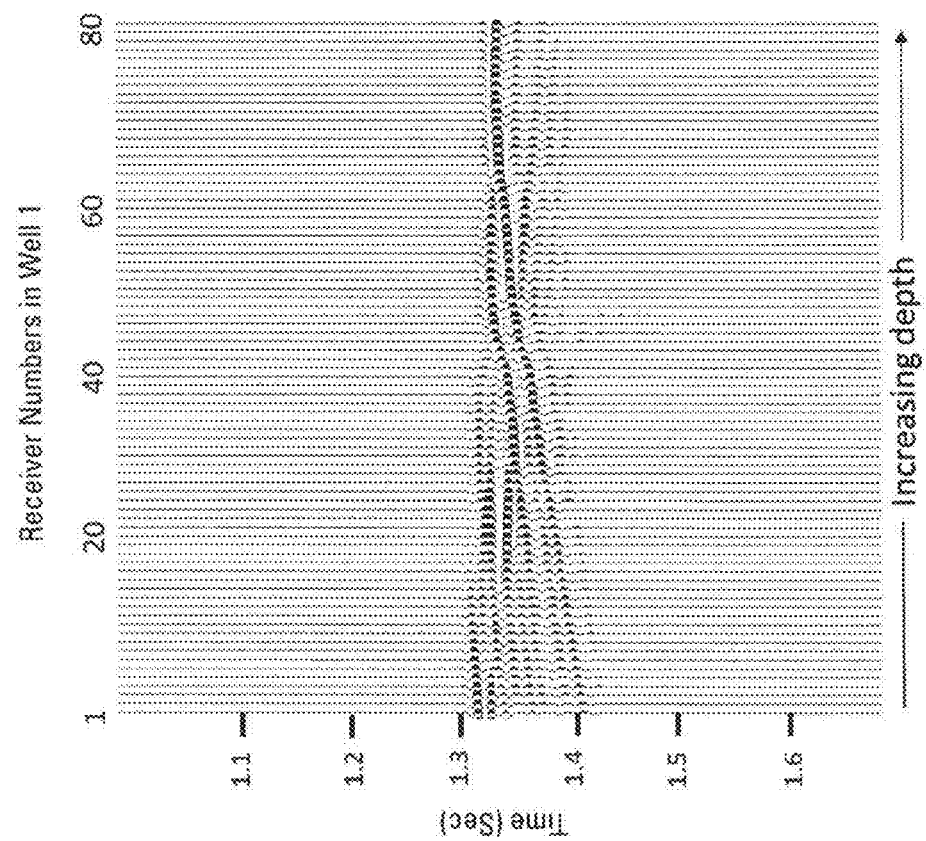

A wave equation seismic modeling program using the standard mathematical finite difference method is employed to generate the synthetic field seismic data corresponding to the wave field $\psi_{\alpha1\beta1}(S_n, G_{m1}, t)$ and $\psi_{\alpha2\beta2}(S_n, G_{m2}, t)$ in Equation (1) for the acquisition configuration in FIGS. 3, 4, and 5. For simplicity and without the loss of generality, only results for P wave sources and hydrophones are displayed and discussed. The synthetic P seismic traces from one surface source to the receivers in the wells are generated with finite difference modeling. Two panels of seismic signals detected at the receiver arrays in well 1, shown in FIG. 6A, and well 2, shown in FIG. 6B, corresponding to one surface source point are displayed in seismic industry format. As expected, the seismic early arrivals have limited variation in arrival time as a function of receiver depth, i.e., limited time moveout in standard seismic industry vocabulary. This would indicate that the wave field arriving at the observation wells are predominantly moving in the horizontal direction as expected because the seismic acquisition geometry is specifically designed with the intent to create dominantly horizontal propagation of early arrivals at the observed wells. It should be noted that the seismic arrivals are complex due to the interference of many different wave paths. Therefore, it is not always possible to pick the travel times of direct P wave arrivals. This deficiency would be cured by the virtual source method because the emulated cross-well signals from virtual sources are much simpler with better signal to noise as demonstrated in the simulation results discussed below.

FIG. 7 displays the cross-well seismic signals of the emulated virtual sources located at receiver locations in well 2 arriving at receivers in well 1. The seismic signals from the emulated virtual sources are the results after processing the synthetic seismic traces through step 7 of the processing sequence in FIG. 1. The displayed cross-well signals of emulated virtual sources corresponds to W pp $(G_{m2}, G_{m1}, t)$ where the depth of the virtual sources in well 2 and the receivers in well 1 are the same. FIG. 7A shows the geometrical relationship—the emulated virtual sources located at $G_{m2}$ in well 2 sending seismic signals directly across to receivers at $G_{m1}$ in well 1 at the same depths. FIG. 7B and FIG. 7C display the amplitude signals of the virtual source and receiver pairs for the 80 depth locations separated by 20 feet that are separated by 400 feet horizontally. FIG. 7C corresponds to the velocity case where there are two, small low-velocity anomalies, while FIG. 7B is the velocity case when the two velocity anomalies are absent.

Figure 7A:
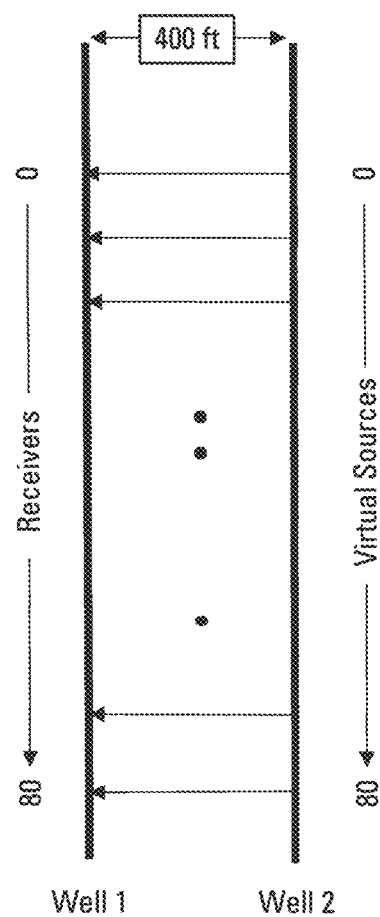
Figure 7B:
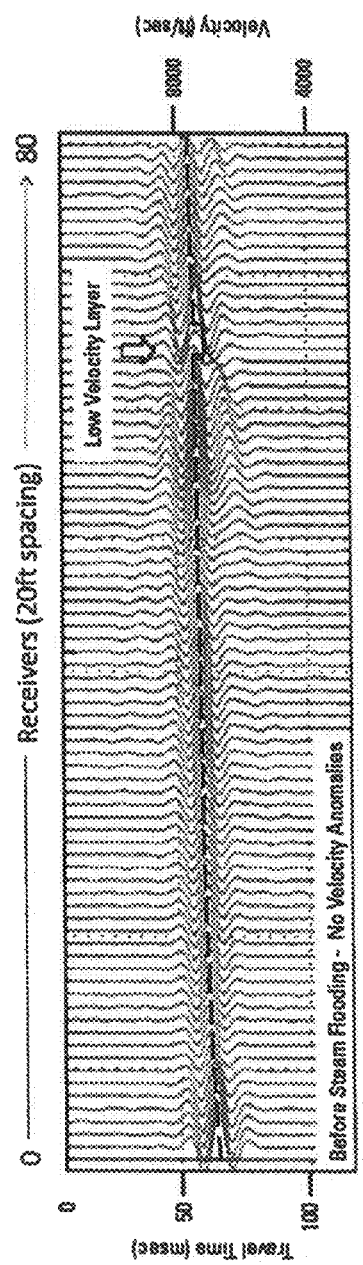
FIGS. 7B and 7C are numerical simulation results showing direct arrival events in cross-well seismic signals of virtual sources, where the receiver pairs are located at the same depth without velocity anomalies and with velocity anomalies, respectively.

In contrast to the typical original recorded seismic signals shown in FIG. 6, the cross-well virtual source seismic signals in FIG. 7B shows only a single dominant event corresponding to a P wave direct arrival with a zero phase wavelet from virtual sources in well 2 to receivers in well 1. The signal-to-noise is excellent with very minimal noise contaminations. This is mainly due to the fact that the acquisition geometry is designed to ensure that the seismic waves from the surface contain propagation that are mostly perpendicular to the well so that the cross-well emulated virtual sources in well 2 in FIG. 7 beam the seismic waves mostly perpendicular to the borehole creating strong cross-well signals of direct arrivals at receivers in well 1 of FIG. 7. The P wave travel times between the virtual source-receiver pairs can easily be picked from the peaks of the direct arrival signals. As the separation between the well is known (400 feet in this simulated case), the inter-well velocity between wells calculated from the velocity model in FIG. 3 is displayed as a velocity scale on the right hand side of FIGS. 7B and 7C.

From FIG. 7B, it may be observed that the inter-well P velocity between the two wells is gradually increasing with depth with a slightly varying gradient associated with a thin low velocity layer at the depth around receiver number 65. The dashed line in FIG. 7B shows the overlay of calculated travel times and average velocities between wells from the input velocity model using straight line ray paths. The travel time and velocity model match is excellent demonstrating the effectiveness of the virtual source methodology in measuring inter-well velocities. It should be noted that the seismic signals of the virtual sources to the receivers are independent of the overburden velocity and the phase of wavelet signal is zero phase—a well-understood property of the virtual source method in seismic interferometry technology that can be proven theoretically from time reversal principle.

Figure 7C:
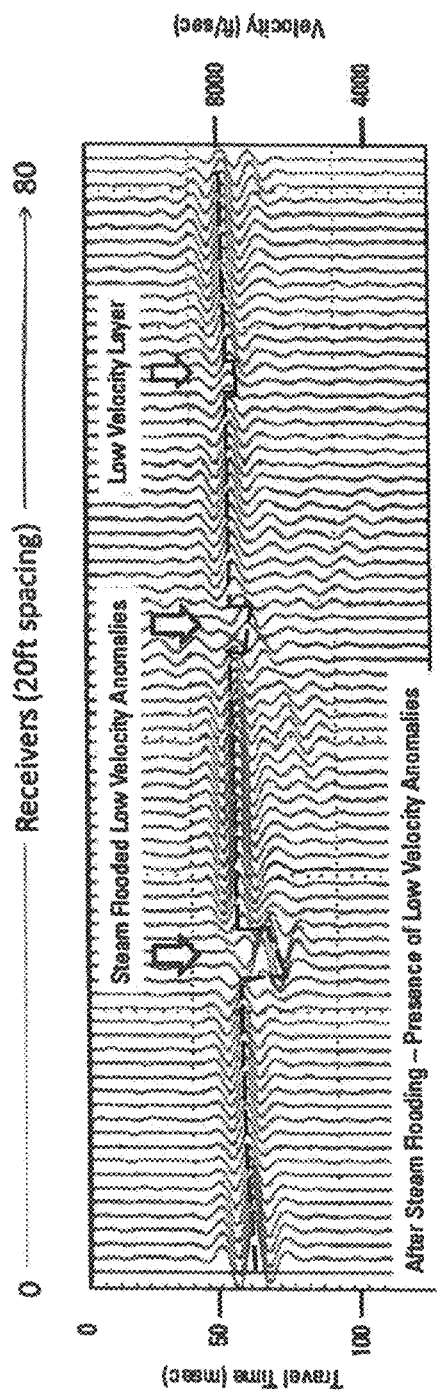

FIGS. 7B and 7C show the comparison of the cross-well emulated signals between the two cases: without the two small velocity anomalies (FIG. 3) and with the two small velocity anomalies (FIG. 4). The dashed line overlay in FIG. 7C is the expected travel time delays with straight line ray paths using the input velocity model in FIG. 4. The agreement between the dash line overlay with the actual peak of the signal wavelets is good. The two low-velocity anomalies are clearly detected at the correct receiver locations in FIG. 7C when compared with FIG. 7B. These simulation results demonstrate the feasibility of time-lapsed application of the present measurement methodology to detect local low velocity zones introduced by steam front movement spreading over time.

Figure 7D:
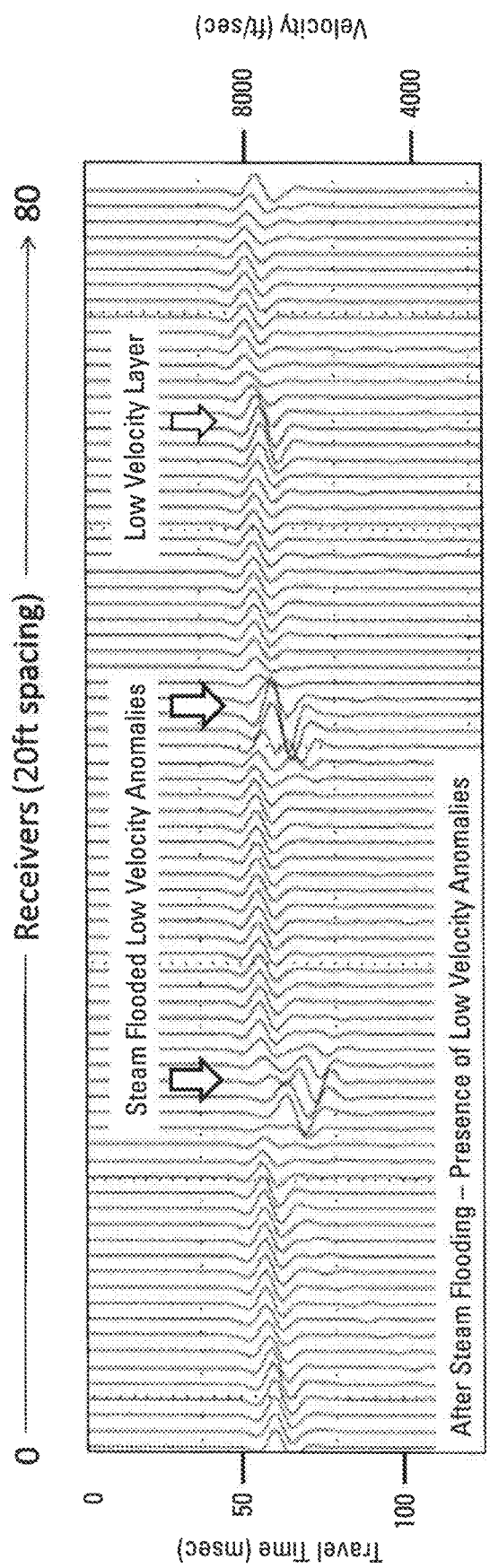
FIG. 7D shows the cross-well signals computed by finite-difference modeling for the same configuration of virtual sources and receivers as in FIG. 7C.

Closer examination of the comparison of the overlay in FIG. 7C reveals some small mismatches between the dash line overlay computed by straight line ray paths and the peaks of the waveforms in the areas of two low velocity anomalies. FIG. 7D shows the waveforms of the cross-well signals computed directly by finite difference modeling for seismic point sources in well 2 and receivers in well 1 for the case with velocity anomalies in FIG. 4. The match between FIGS. 7D and 7C is excellent. These results indicate that the use of straight-line ray paths to invert travel times for velocity estimates might not give full accuracy. Advanced processing methods known in the seismic industry such as tomographic or full waveform inversion would be required to extract inter-well velocity information from the virtual source cross-well data when the velocity between the wells is complex (See references 7 and 8). Applications of these methods are indicated as step 8 in the high level processing and analysis sequence in FIG. 1.

The simulation results and the ensuing discussions above are for P wave seismic surface sources and hydrophone receivers in the two wells. Similar results would be obtained for shear velocity information between two wells when the surface seismic sources are shear wave sources (Sv or Sh) with 3-component geophones in the wells.

The measurement workflow described in FIG. 1 has significant application for real time monitoring of changes to in situ reservoir properties induced by hydraulic fracturing in unconventional reservoir production. The inter-well velocity measurements with the cross-well virtual sources for P, Sv and Sh waves can be combined with vertical velocity measurements from standard industry logging or check shot surveys or Vertical Seismic Profile (VSP) to yield the anisotropy properties of the zones between the two wells. These information are very important for the unconventional oil and gas industry as these anisotropy factors are related to the local stress field and compaction history that control the directivity of natural and induced fracture orientations. Furthermore, shear wave propagation velocity and amplitude are impacted by fractures and fracture orientations. Thus, the capability of measuring local changes in velocity fields around a producing well before and after HF operation would yield valuable insights on the nature and effectiveness of the fractures created by HF operations. The applicability of measurement workflow in FIG. 1 to monitor the impact of HF operations to reservoir geomechanical properties are demonstrated with the computer simulation results discussed below.

Figure 8:
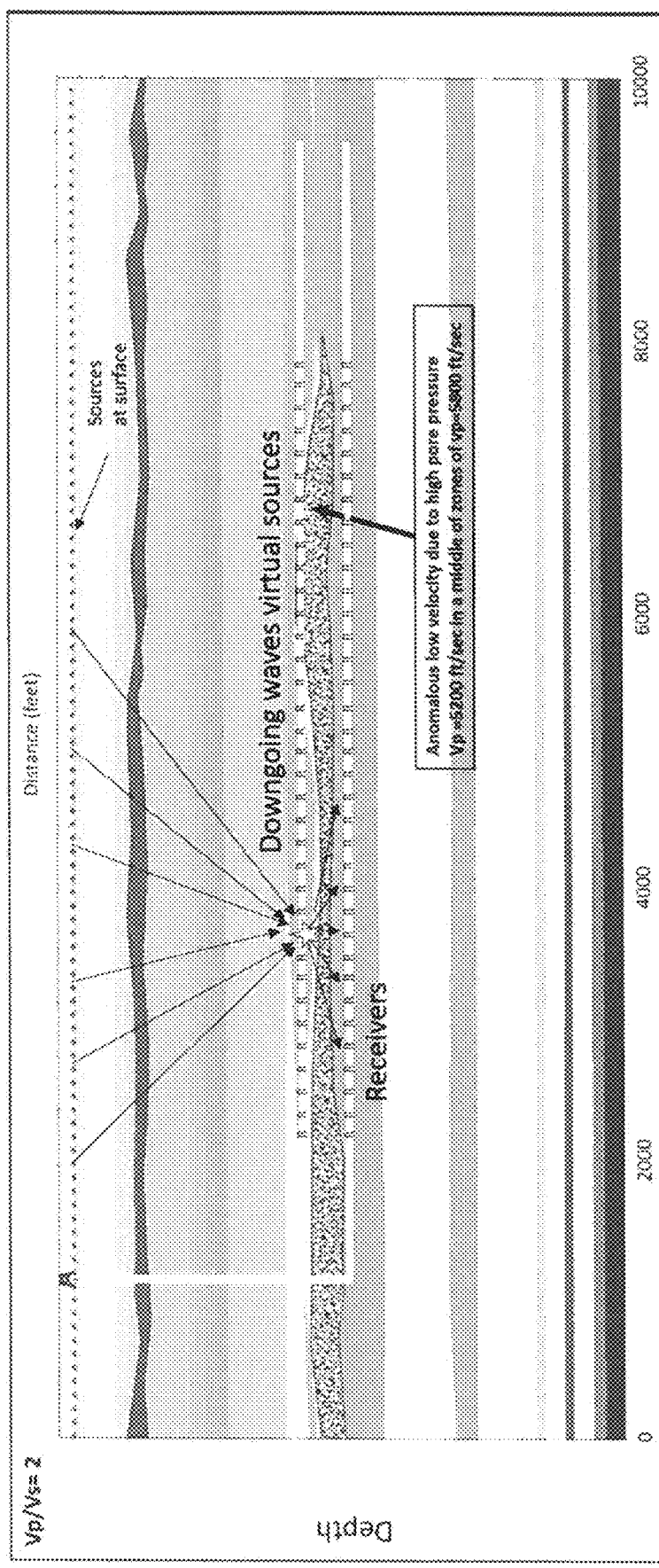
FIG. 8 is an illustration of a vertical cross section of seismic sources and receivers acquisition geometry for cross-well simulation of virtual sources in two vertically separated horizontal wells with the velocity model used in numerical simulation.
Figure 9:
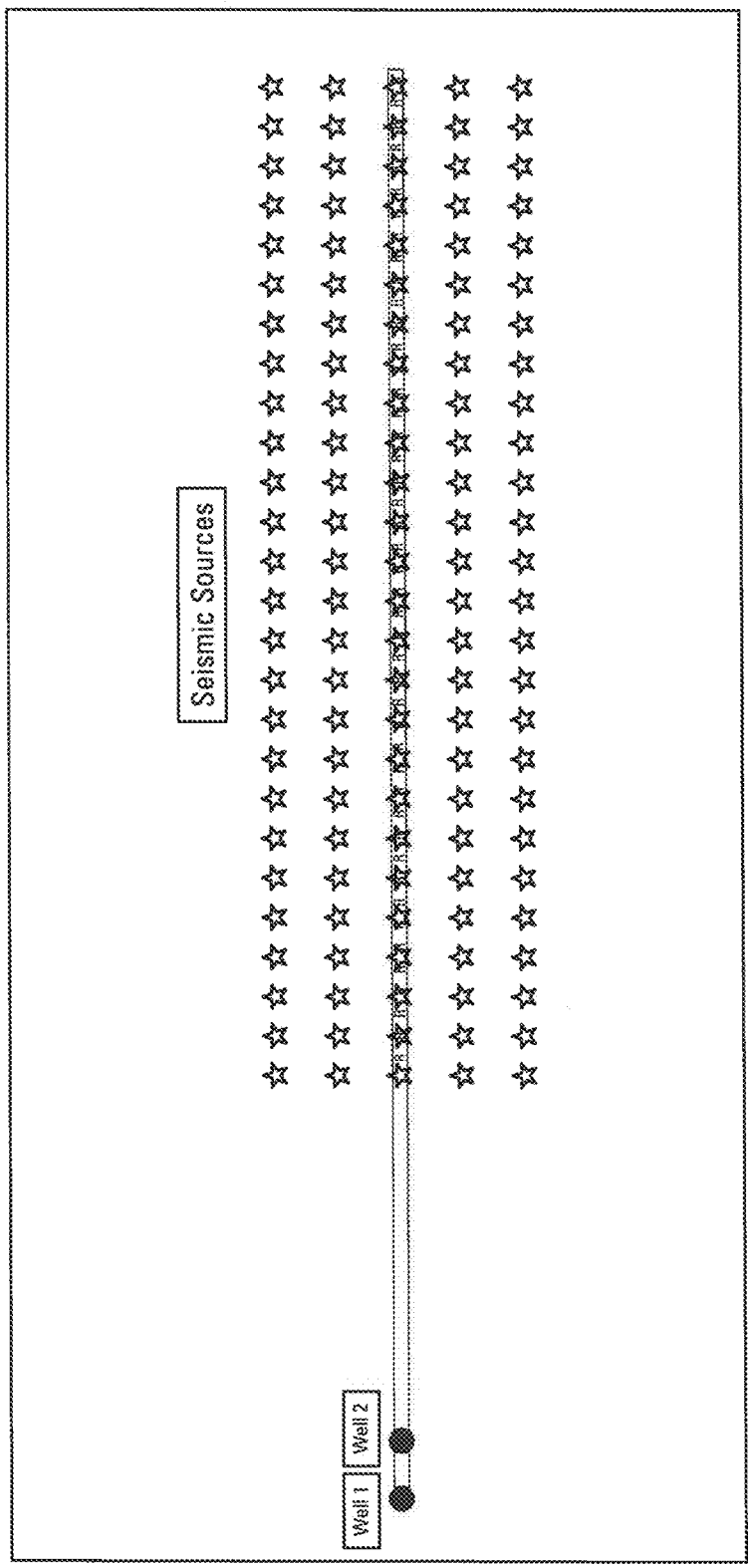
FIG. 9 is a schematic representation of a horizontal view of an embodiment of seismic source and receiver acquisition geometry for cross-well simulation of virtual sources in two vertically separated horizontal wells.
Figure 10:
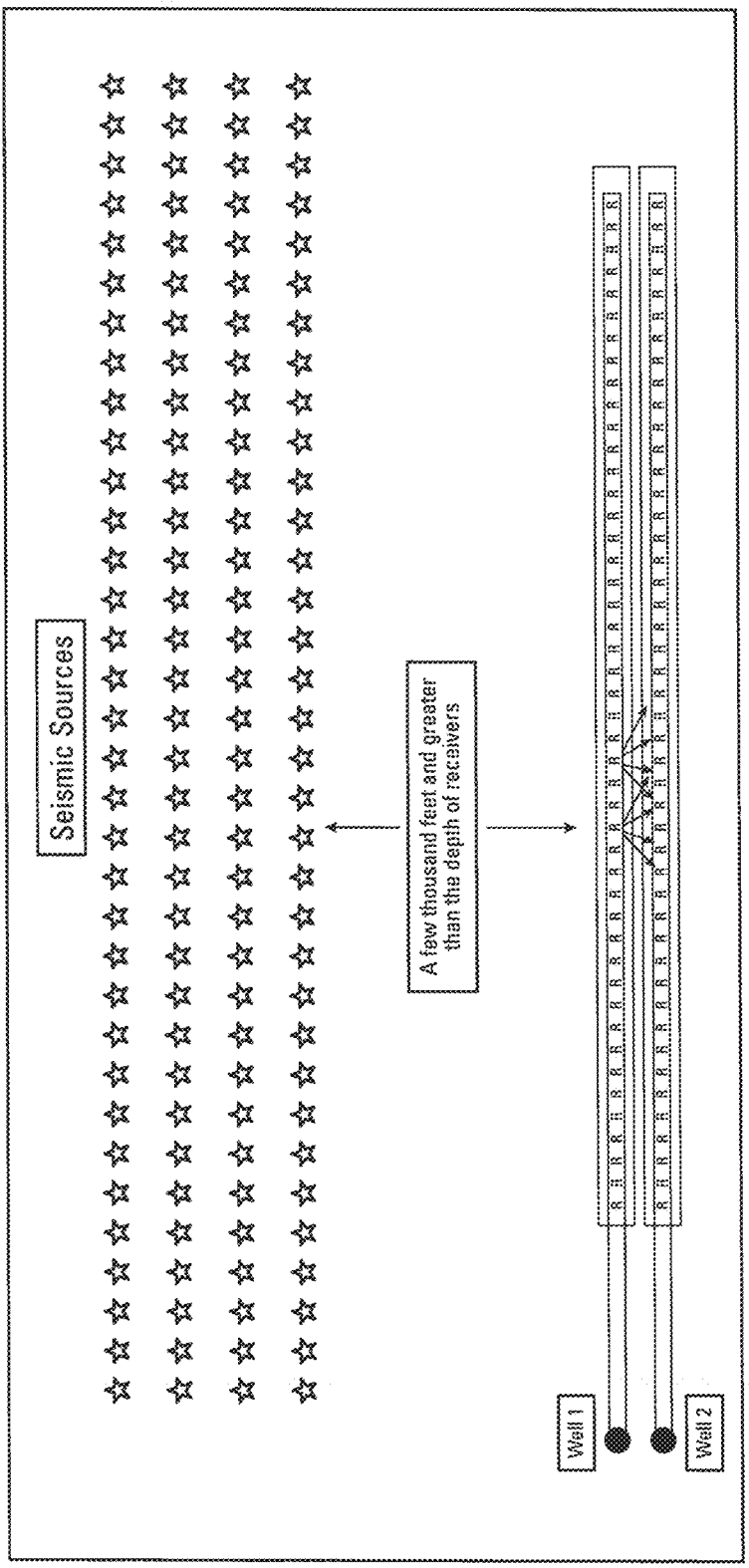
FIG. 10 is a schematic representation of a horizontal view of an embodiment of seismic sources and well location geometry for cross-well simulation of virtual sources using two parallel horizontal observation wells at approximately the same depths to measure inter-well horizontal velocities.

FIG. 8 shows a vertical cross-section of the subsurface model that is used in the computer simulation. FIG. 8 also shows two horizontal observation wells that would sandwich a reservoir section where HF operations would be applied in a production well bore. In this particular model, there is a significant laterally varying low velocity zone that is related to variation in pore pressure and/or gas content of the local reservoir section between the horizontal wells. FIG. 9 shows a seismic acquisition geometry that is designed to measure vertical velocities in the reservoir section between two vertically spaced horizontal wells in FIG. 8. In FIG. 9, the seismic sources are located in an array pattern directly above the receivers distributed along the horizontal wells. It should be noted that if measurement of velocity is required in a different orientation, the two observation wells can be oriented appropriately and the seismic source array at the surface can be suitably designed to optimize the virtual source signal. FIG. 10 shows the horizontal view of a non-limiting example of a configuration with surface seismic source array and two horizontal wells at depth that are spaced apart horizontally to measure inter-well horizontal velocity.

Figure 11A:
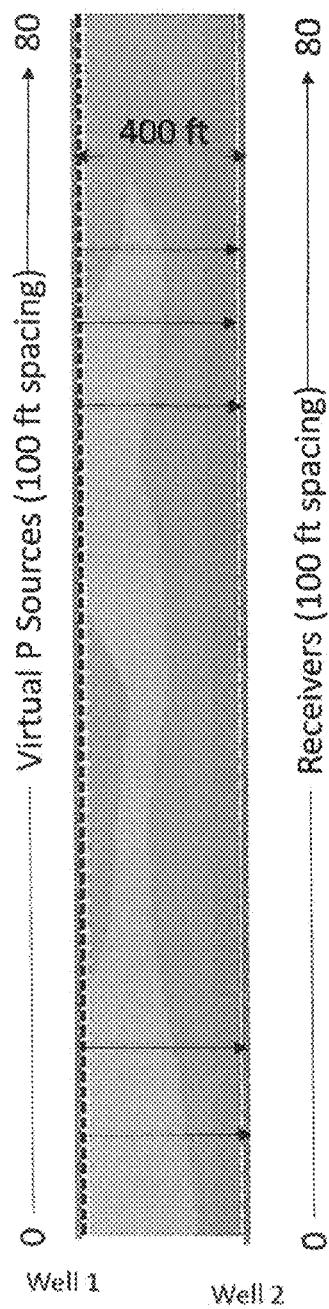
Figure 11B:
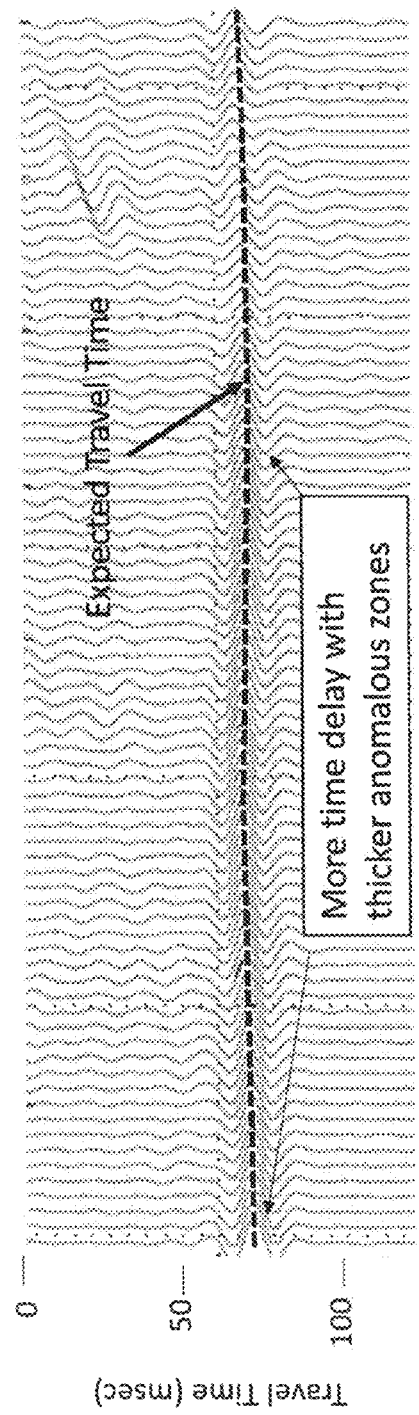
FIG. 11B is an illustration of numerical simulation results showing direct arrival events in cross-well seismic signals of virtual source and receiver pairs.
Figure 12A:
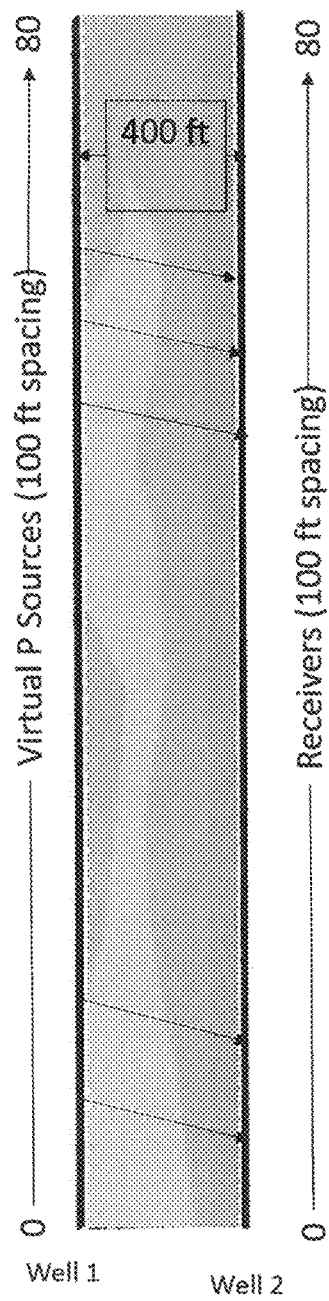
Figure 12B:
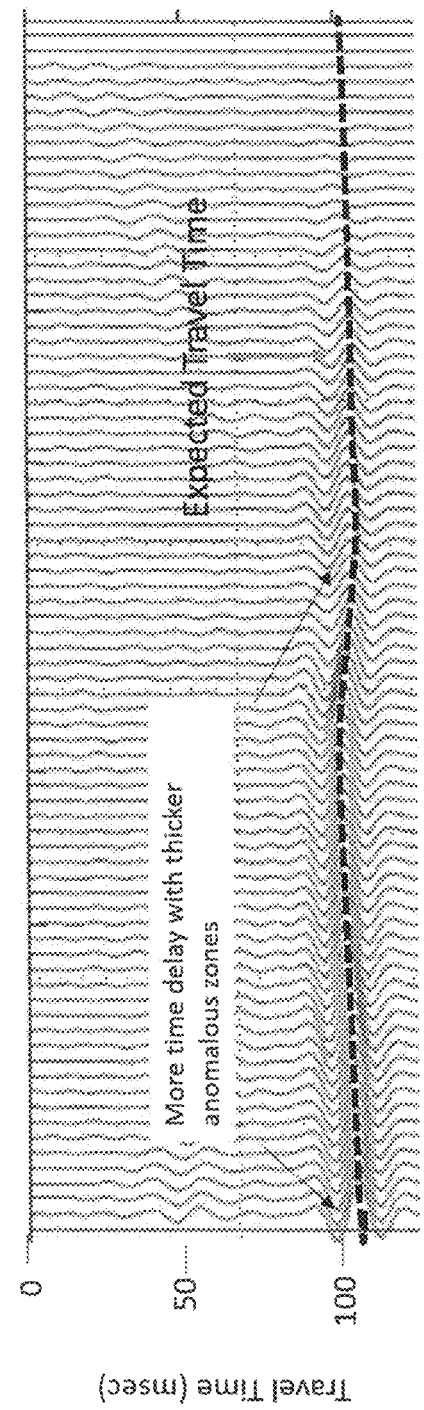
FIG. 12B is an illustration of numerical simulation results showing direct arrival events in cross-well seismic signals of virtual source and receiver pairs.

A simulation exercise using the workflow through step 7 in FIG. 1 is conducted to test whether cross-well seismic signals from the virtual sources in the first well to receivers second well can detect the low-velocity layer in FIG. 8. Simulation results for the configuration in shown in FIGS. 8 and 9 for vertically separated horizontal wells for vertical velocities are discussed below. Synthetic seismic are generated by numerical finite difference modeling for P wave source at the surface with the acquisition geometry in FIG. 9. The results of the simulation test are shown in FIGS. 11 and 12. The display in FIG. 11 shows the emulated cross-well seismic signals between virtual source and receiver pairs where the receiver is located directly below the virtual source. The signal-to-noise ratio of direct P wave arrivals is excellent. The expected travel times calculated from the exact velocity model match the peak of the emulated cross-well seismic signal very well. Where the low velocity layer is thick, there is a greater travel time delay as expected. The display in FIG. 12 shows the seismic traces of seismic signals between virtual P source and hydrophone receiver pairs where the receiver is located below the virtual source but with a lateral offset of 400 ft. In this case, the direct wave from the virtual source would be propagating at 45 degrees. Again, the expected travel times from the velocity model matches the peak of the seismic signal wavelets. The time delay due to the low-velocity zone is more pronounced as the travel path is along 45 degree angle and is therefore longer by a factor equal to square root of 2.

Figure 13:
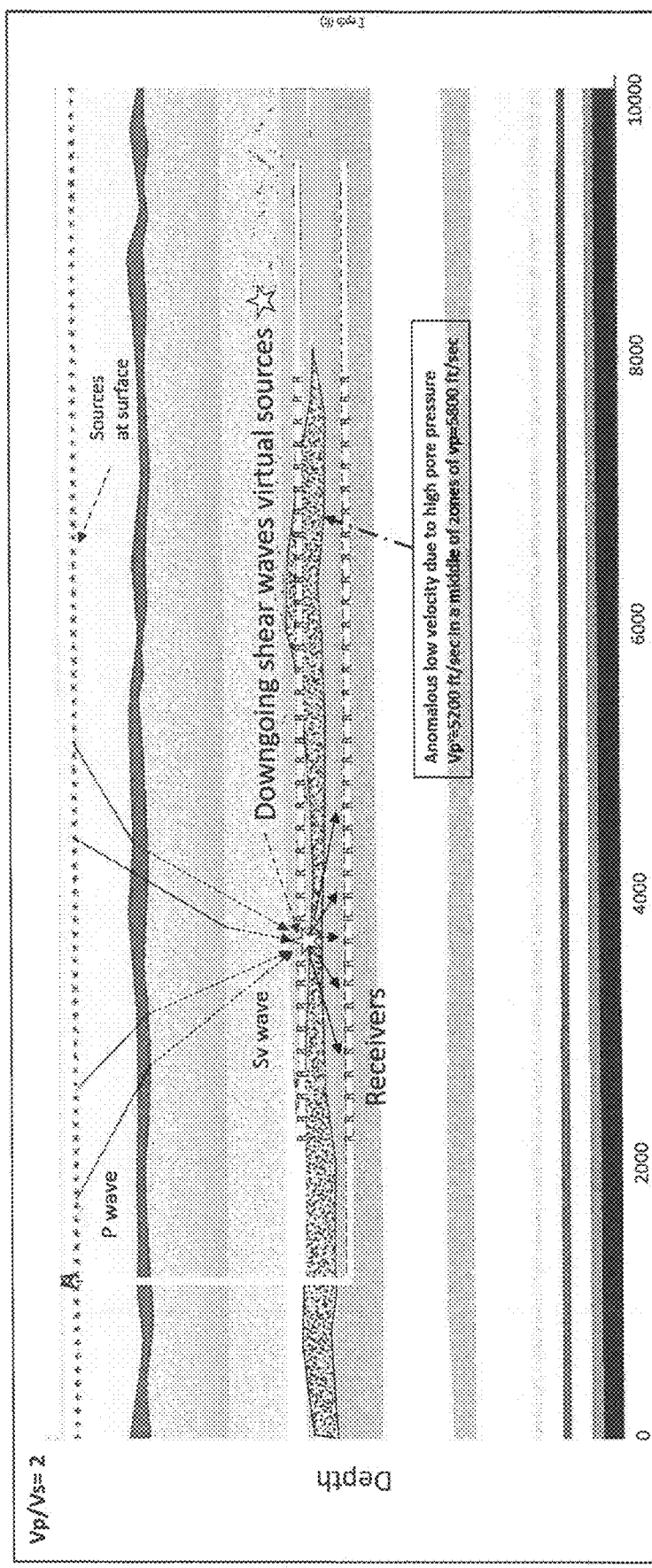
FIG. 13 is a diagram of a vertical cross-section of an embodiment of seismic source and receiver acquisition geometry for cross-well simulation of Sv virtual sources in two vertically separated horizontal wells with the velocity model of FIG. 8 used in the numerical simulation.
Figure 14A:
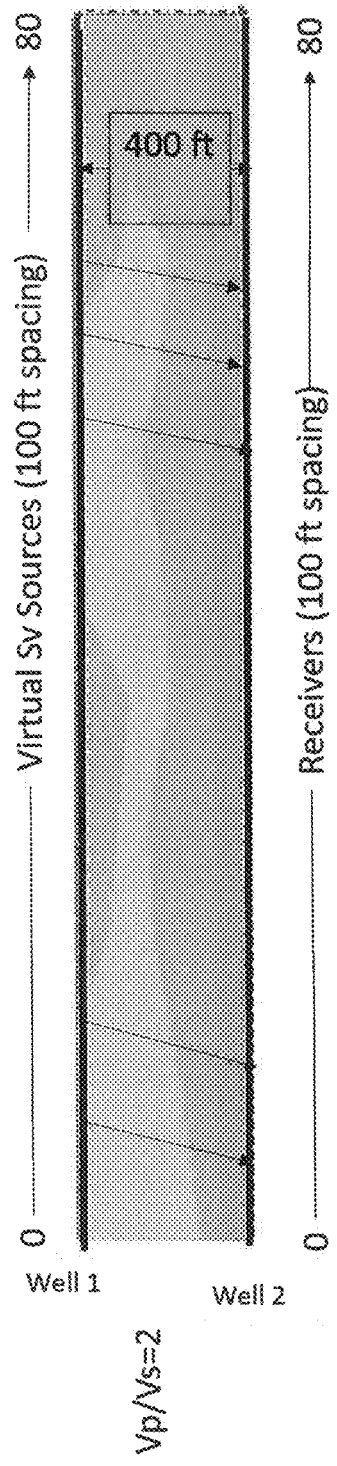
Figure 14B:
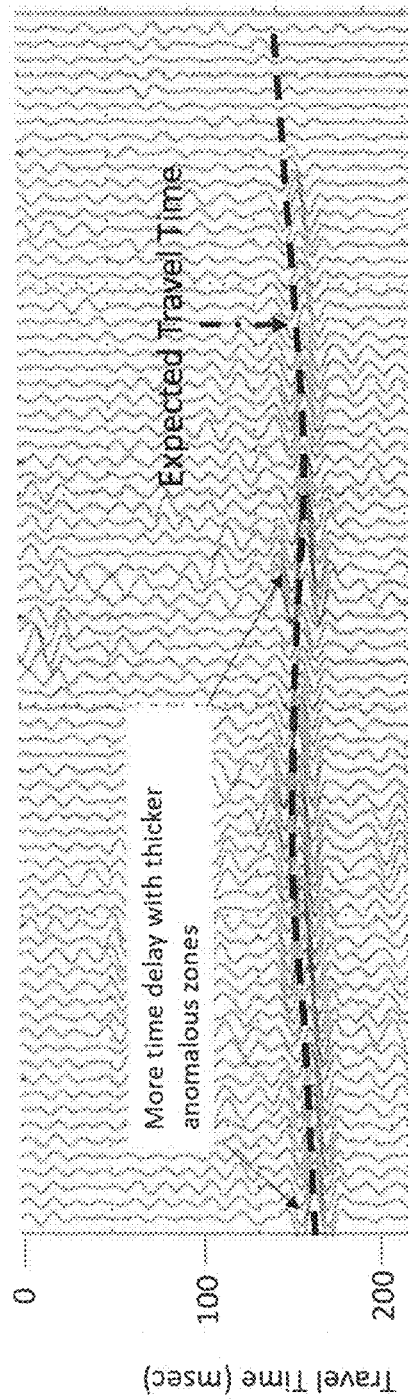
FIG. 14B is an illustration of the numerical simulation results showing Sv direct arrival events in cross-well seismic signals of virtual source and receiver pairs, where Vp/Vs=2.

FIG. 13 shows how virtual Sv sources can be generated with P wave sources at the surface due to P-Sv conversion at the shallower interfaces. The receivers in the wells are three component geophones. Synthetic Sv signals recorded at three component geophones located in the horizontal observation wells from P source at the surface are computed using finite difference modeling for the velocity model in FIG. 13 with Vp/Vs=2. The processing sequences through step 7 in FIG. 1 of synthetic seismic data generated by numerical finite difference modeling can be applied. FIG. 14 shows the emulated cross-well seismic signals $W_{SvSv}$ ($G_{m2}$, $G_{m1}$, t) between pairs of virtual Sv sources located in the upper observation wells and Sv receivers located in the lower observation wells. In this display, the receiver is located below the virtual source with a lateral offset of 200 ft. The simulation results displayed in FIG. 14 show that the low velocity zone is well delineated in the lateral direction. The Sv travel time delay in FIG. 14 is more pronounced than the P wave results, because of Sv wave propagation is slower than P wave propagation. It is clear from the simulation results that many combinations of cross-well P, Sv and Sh type of signals can be generated to yield information on P, Sv and Sh velocities in many different directions between any two horizontal wells.

The simulation results discussed above demonstrate the capability of embodiments of the present measurement methodology to determine the inter-well P, Sv and Sh velocities in various directions with good spatial resolution. Poisson's ratio and anisotropy can then be calculated to yield information on the local variations of brittleness and pore pressure of the reservoir, which are critical information for HF operation planning.

Figure 15A:
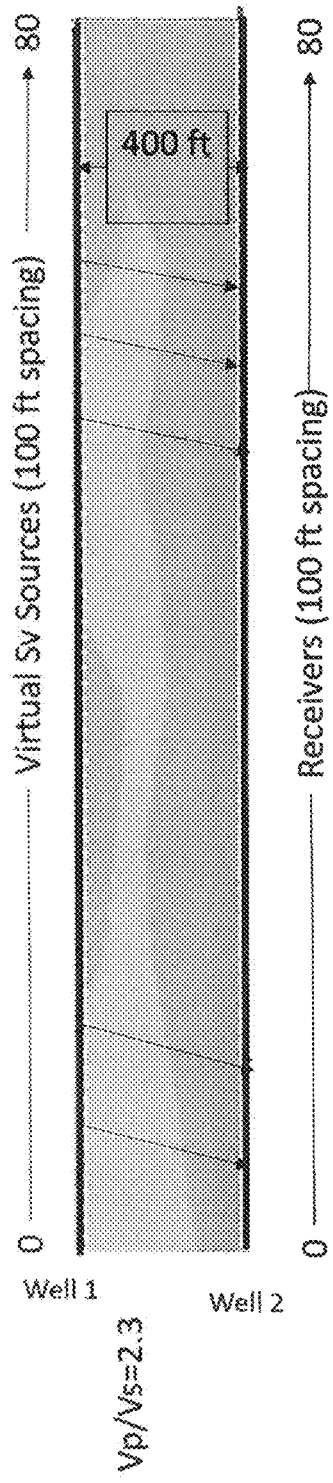
Figure 15B:
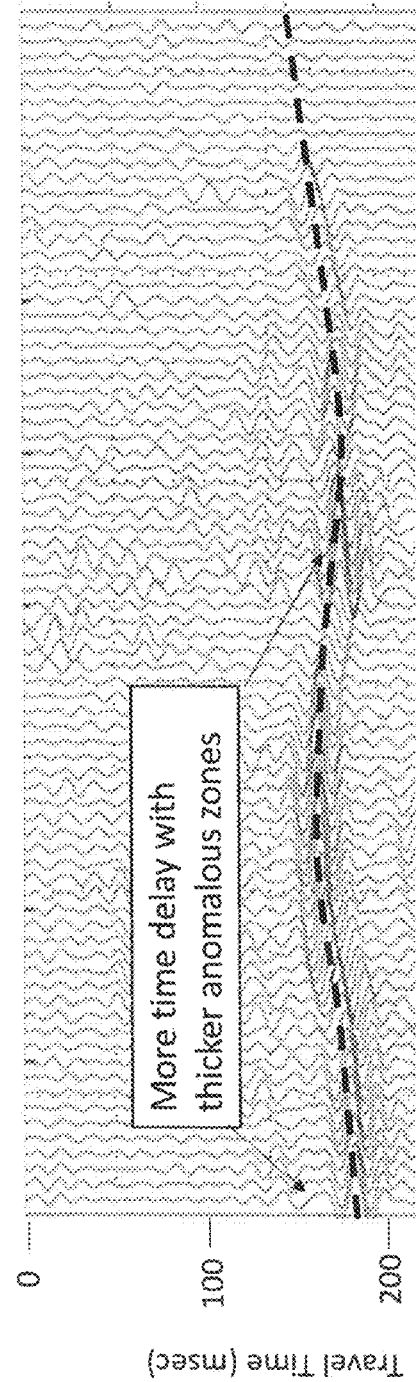
FIG. 15B is an illustration of the numerical simulation results showing Sv direct arrival events in cross-well seismic signals of virtual source and receiver pairs, where Vp/Vs is now 2.3 due to time-lapse effects.

Each stage of HF would induce fractures as well as effective stress in reservoir sections locally and would induce significant local changes in Vp, Vs and Vp/Vs which is related to Poisson's ratio. Thus, a capability to measure the local changes to Vp, Vs and Vp/Vs of the targeted reservoir section due to each stage of HF operation would provide valuable information to assess the local impact of the HF operation on the geomechanical properties of the reservoir. To demonstrate the time lapsed capability of the present measurement methodology to detect changes in Vp/Vs which is related to Poisson's ratio, computer simulation using seismic data generated by numerical finite difference modeling was performed for the case where Vp/Vs of the anomalous low velocity zone in FIG. 14 is increased by 15%, i.e., from 2 to 2.3, with unchanged Vp. The time delay in travel times of Sv wave is expected to be larger for the case when Vp/Vs is equal to 2.3 than for the case when Vp/Vs is equal to 2 as the Sv wave speed in the former case is much slower. FIGS. 14 and 15 show the comparison of the simulation results of cross-well emulated signals for the two cases. The increases in travel delay due to Vp/Vs increase from 2 to 2.3 are very detectable. These results show that time-lapsed changes in Vp/Vs or Poisson's ratio to a local reservoir section can be detected by the present measurement methodology and demonstrates that the time-lapsed application of the present measurement methodology to monitor the impact of HF operation at each stage to reservoir geomechanical properties is feasible.

The seismic acquisition with Vibroseis trucks of a typical source array consisting of 100 locations can normally be completed in a few hours. The computation of processing and analysis to obtain the simulation results shown above was accomplished on a Windows 10 desktop PC with an Intel 17 quad core chip within an hour. With powerful workstation commercially available today, the processing and analysis can be reduced to minutes. Thus, the present measurement methodology can be completed in a few hours, which would be considered as real time because typical HF operation for each stage would have a similar duration.

The simulation results for steam flood and HF examples above demonstrate that time-lapsed changes in velocities between two wells are highly detectable with the present measurement methodology that employs surface seismic sources and receivers in two or more observation wells together with the virtual source technique using the workflow described in FIG. 1. It is an effective method for field engineers to (a) measure and assess in real time the time-lapsed changes in reservoir geomechanical properties that are induced by depletion, production stimulation with hydraulic fracturing and/or tertiary recovery with gas or steam injection, and (b) make real time adjustments to their field operation to optimize field production and cost.

The foregoing description of embodiments of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

REFERENCES

1. U.S. Pat. No. 4,214,226 issued Jul. 22, 1980 to Narasimhan et al.
2. Seismic Interferometry: History and Present Status, Kees Wapenaar et al., SEG Geophysics Reprint Series (2008)
3. Seismic Interferometry, G. T. Schuster, Cambridge University Press (2008)
4. Cross-well seismic survey without borehole source, Minato et al., Extended Abstract SEG Annual Meeting (2007)
5. The virtual source method: Theory and case study, A. Bakulin and R. Calvert, Geophysics Volume 71, No. 4 (2006)
6. Virtual source method applied to cross-well and horizontal well geometries, K. Mehta et al., Leading Edge (2010)
7. Image-domain and data-domain waveform tomography: a case study, E. Diaz et al., Extended Abstract SEG Annual Meeting (2015)
8. U.S. Pat. No. 9,075,159 Issued Jul. 7, 2015 to J. K. Washbourne et al.

What is claimed is:

1. A method for measuring geomechanical properties in a section of a reservoir, comprising:
    drilling or selecting existing two or more observation wells in the reservoir section, each observation well having a borehole and a wellhead, wherein at least two of the two or more observation wells being parallel and oriented vertically, and/or at least two of the two or more observation wells having a horizontal section spaced-apart a chosen distance, parallel, and at the same depth;
    placing seismic energy receivers in the two or more observation wells;
    placing surface seismic energy sources at remote locations away from the wellhead of each of the two or more observation wells such that seismic energy flows in a horizontal direction toward the two or more observation wells, and noise caused by the surface seismic energy sources generating tube waves down the two or more observation wells is minimized;
    receiving seismic energy by the seismic energy receivers in the at least two or more observation wells;
    generating direct emulated cross-well seismic signals from virtual seismic sources in the two or more observation wells from the received seismic energy using seismic interferometry techniques; and
    deriving compression and shear velocities in the horizontal direction from the generated emulated cross-well signals from which said geomechanical properties are determined.

2. The method of claim 1, wherein the remote locations are chosen by computer simulation of emulated cross-well seismic signals from virtual sources, using computer-generated synthetic seismic data or seismic data generated in the reservoir section.

3. The method of claim 1, further comprising the step of removing the noise caused by the surface seismic energy sources from the emulated cross-well seismic signals used for deriving compression and shear velocities by electronic filtering.

4. The method of claim 1, wherein the geomechanical reservoir section properties comprise Poisson's ratio.

5. The method of claim 1, wherein the geomechanical reservoir section properties comprise anisotropic properties.

6. The method of claim 1, wherein the remote locations of the seismic energy sources away from the wellheads of the two or more observation wells are chosen to minimize interference with field operational activities in the vicinity of the two or more observation wells.

7. The method of claim 1, wherein changes in geomechanical properties in the section of the reservoir over time are monitored by repeating the steps comprising: receiving seismic energy by the seismic energy receivers in the at least two observation wells; generating emulated cross-well seismic signals of virtual seismic sources in the at least two observation wells from the received seismic energy using time interferometry techniques; and deriving compression and shear velocities in multiple directions from the generated emulated cross-well signals, as a function of time.

8. The method of claim 7, wherein the changes in geomechanical properties in the section of the reservoir over time result from oil depletion, or tertiary oil recovery using gas or steam.

9. The method of claim 7, wherein the geomechanical reservoir section properties are utilized to monitor the location of a steam front from steam flooding.

10. The method of claim 1, wherein the changes in geomechanical properties in the section of a reservoir over time are responsive to production stimulation using hydraulic fracturing in at least one of the horizontal sections.

11. A method for measuring geomechanical properties in a section of a reservoir, comprising:
    drilling or selecting existing two or more observation wells in the reservoir section, each observation well having a borehole, a wellhead, and at least two of the two or more observation wells having a horizontal borehole section, wherein at least two of the horizontal sections are spaced-apart a chosen distance, parallel, and at different depths in the reservoir section;

placing seismic energy receivers in the two or more observation wells;

placing surface compression wave seismic energy sources at remote locations away from the wellhead of each of the two or more observation wells, and above the at least two horizontal sections at a distance sufficiently great such that compression wave seismic energy flowing toward the at least two horizontal sections is converted into shear wave seismic energy by geomechanical properties of earth layers above the reservoir;

receiving the shear wave seismic energy by the seismic energy receivers in the at least two observation wells;

generating emulated cross-well shear wave seismic signals of virtual shear wave seismic sources in the at least two observation wells from the received seismic energy using seismic interferometry techniques; and deriving shear velocities in multiple directions from the generated emulated cross-well signals, from which said geomechanical properties are determined.

12. The method of claim 11, wherein the remote locations are chosen by computer simulation of emulated cross-well seismic signals from virtual sources, using computer-generated synthetic seismic data or seismic data generated in the reservoir section.

13. The method of claim 12, wherein the remote locations are chosen to minimize noise caused by surface seismic signals generating tube waves down the two or more boreholes.

14. The method of claim 13, further comprising the step of removing the noise caused by surface seismic signals from the emulated cross-well signals used for deriving shear velocities by electronic filtering.

15. The method of claim 11, wherein the remote locations of the seismic energy sources away from the wellheads of the two or more observation wells are chosen to minimize interference with field operational activities in the vicinity of the two or more observation wells.

* * * * *